United States Patent
Ogura et al.

(10) Patent No.: US 11,983,940 B2
(45) Date of Patent: May 14, 2024

(54) AUTONOMOUS VEHICLE

(71) Applicant: YAMAHA HATSUDOKI KABUSHIKI KAISHA, Iwata (JP)

(72) Inventors: Kotaro Ogura, Shizuoka (JP); Takehiro Ogawa, Shizuoka (JP); Yoshiki Kuranuki, Shizuoka (JP); Hokuto Fujii, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 455 days.

(21) Appl. No.: 17/239,282

(22) Filed: Apr. 23, 2021

(65) Prior Publication Data

US 2021/0241010 A1 Aug. 5, 2021

Related U.S. Application Data

(63) Continuation-in-part of application No. PCT/JP2019/041755, filed on Oct. 24, 2019.

(30) Foreign Application Priority Data

Oct. 24, 2018 (WO) ............... PCT/JP2018/039559
Dec. 7, 2018 (JP) ............................... 2018-230440

(51) Int. Cl.
*G06K 9/00* (2022.01)
*B60W 30/14* (2006.01)
(Continued)

(52) U.S. Cl.
CPC ......... *G06V 20/593* (2022.01); *B60W 30/146* (2013.01); *B60W 60/00253* (2020.02);
(Continued)

(58) Field of Classification Search
None
See application file for complete search history.

(56) References Cited

U.S. PATENT DOCUMENTS 10,527,428 B1 * 1/2020 Mehta .................. G05D 1/0027
2009/0160678 A1 6/2009 Turnbull
(Continued)

FOREIGN PATENT DOCUMENTS

JP 2009531766 A 9/2009
JP 2011210092 A 10/2011
(Continued)

OTHER PUBLICATIONS

"05 GEN 06 GEN", [online], Yamaha Motor Co., Ltd., [Searched on Dec. 7, 2018], Internet URL: https://global.yamaha-motor.com/jp/profile/design/concept/0506gen/index.html.
(Continued)

*Primary Examiner* — Wei Wen Yang
(74) *Attorney, Agent, or Firm* — Rabin & Berdo, P.C.

(57) ABSTRACT

An autonomous vehicle that moves automatically without any driver's manipulation. The autonomous vehicle includes a vehicle body including a deck, and an action-inducing device for inducing an action of a person who is a user of the autonomous vehicle or a non-user around the autonomous vehicle. The action-inducing device including an image-capturing device for capturing the person, and an information presentation device for presenting action-inducing information, to thereby induce the person to take the action.

11 Claims, 24 Drawing Sheets

(51) Int. Cl.
  *B60W 60/00*    (2020.01)
  *G06F 3/01*     (2006.01)
  *G06V 20/59*    (2022.01)
  *G06V 40/10*    (2022.01)
  *G06V 40/16*    (2022.01)
  *G06V 40/20*    (2022.01)

(52) U.S. Cl.
  CPC ............ *G06F 3/017* (2013.01); *G06V 40/107* (2022.01); *G06V 40/172* (2022.01); *G06V 40/28* (2022.01); *B60W 2555/60* (2020.02)

(56) References Cited

U.S. PATENT DOCUMENTS

| | | |
|---|---|---|
| 2016/0167648 A1 | 6/2016 | James et al. |
| 2017/0078019 A1 | 3/2017 | Moriwaki et al. |
| 2019/0103028 A1 | 4/2019 | Kobayashi et al. |

FOREIGN PATENT DOCUMENTS

| | | |
|---|---|---|
| JP | 2015056081 A | 3/2015 |
| JP | 2017054388 A | 3/2017 |
| JP | 2017091400 A | 5/2017 |
| JP | 2017134687 A | 8/2017 |
| JP | 2017182137 A | 10/2017 |
| WO | 2017155740 A1 | 9/2017 |
| WO | 2018037954 A1 | 3/2018 |

OTHER PUBLICATIONS

Zhe Cao et al., "Realtime Multi-Person 2D Pose Estimation using Part Affinity Fields", Apr. 14, 2017. Referred to as "Open Pose" (Carnegie Mellon University https://arxiv.org/pdf/1611.08050.pdf) in the present disclosure.

* cited by examiner

FIG.4
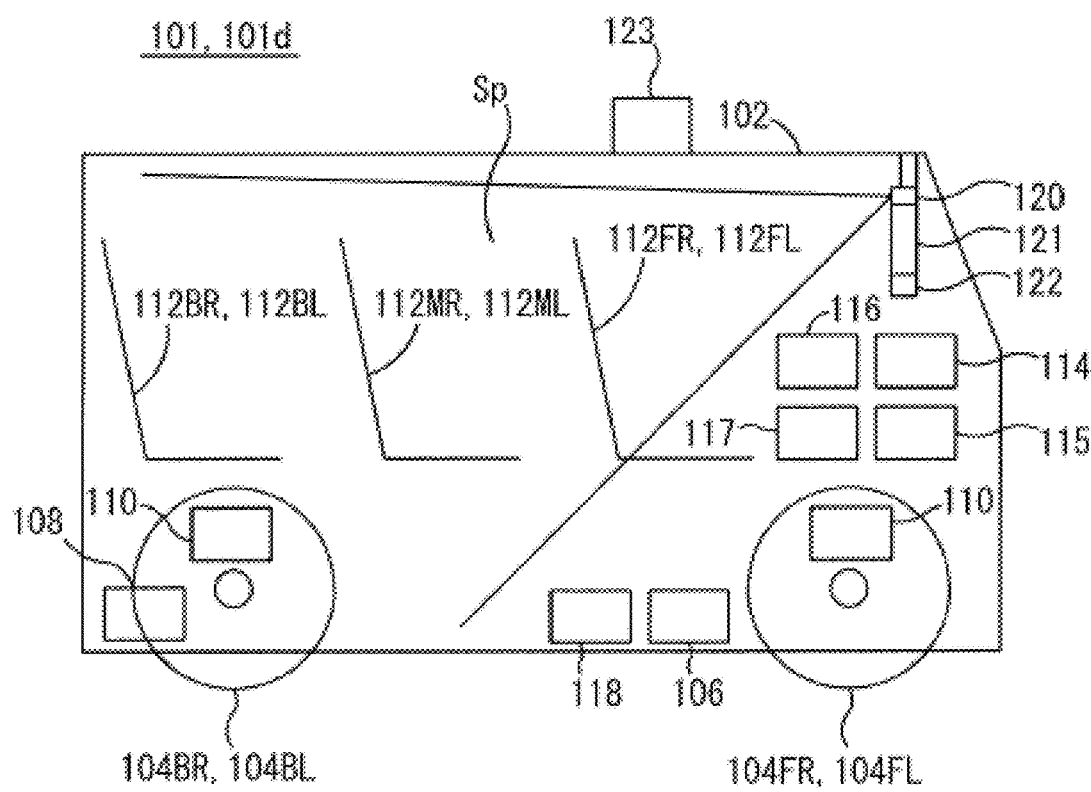
104: 104FL, 104FR, 104BL, 104BR
107: 106, 108, 110
112: 112FL, 112FR, 112ML, 112MR, 112BL, 112BR
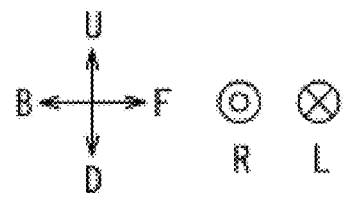

FIG.24
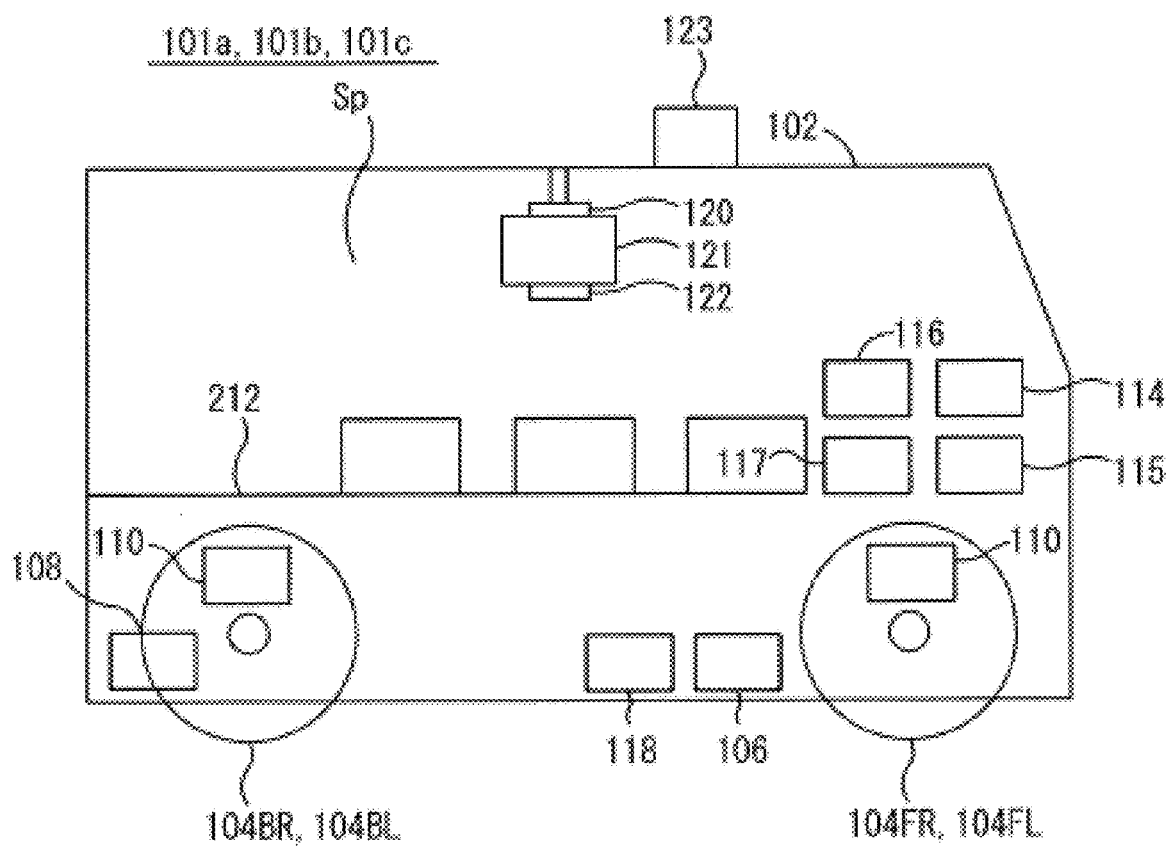
104: 104FL, 104FR, 104BL, 104BR
107: 106, 108, 110
112: 112FL, 112FR, 112ML, 112MR, 112BL, 112BR
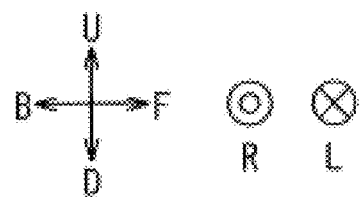

AUTONOMOUS VEHICLE

CROSS-REFERENCE TO RELATED APPLICATIONS

This is a continuation-in-part application of International Application PCT/JP2019/041755, filed on Oct. 24, 2019, which claims priority from International Application PCT/JP2018/039559, filed on Oct. 24, 2018, and a Japanese Patent Application No. 2018-230440, filed on Dec. 7, 2018. The contents of the applications are incorporated herein by reference.

TECHNICAL FIELD

The present teaching relates to an autonomous vehicle that moves automatically without operator's manipulation.

BACKGROUND

As a conventional autonomous vehicle, an autonomous vehicle disclosed in, for example, Non-Patent Document 1 has been proposed.

CITATION LIST

Non-Patent Literature

[Non-Patent Document 1] "05 GEN 06 GEN", [online], Yamaha Motor Co., Ltd., [Searched on Dec. 7, 2018], Internet

SUMMARY OF THE TEACHING

Problems to be Solved

It is expected that the range of uses of autonomous vehicles such as those proposed are to broaden. Autonomous vehicles such as those proposed are often employed at low speed. Accordingly, autonomous vehicles such as those proposed are expected to coexist and cooperate with people.

It is expected that autonomous vehicles that are to coexist and cooperate with people are to have a hardware structure and/or a software structure of low complication.

Accordingly, an object of the present teaching is to provide an autonomous vehicle moving automatically without any driver's manipulation that can coexist and cooperate with people, and to have a hardware structure and/or a software structure of low complication.

Solution to Problems

In order to solve the problem described above, the present teaching comprises as follows.

An autonomous vehicle according to one embodiment of the present teaching moves automatically without operator's manipulation. The autonomous vehicle according to one embodiment of the present teaching comprises a vehicle body and an action-inducing device. The vehicle body includes a deck for putting on a person and/or baggage. The action-inducing device induces an action of a user of the autonomous vehicle or a person around the autonomous vehicle. The action-inducing device includes an image-capturing device and an information presentation device. The image-capturing device captures a user of the autonomous vehicle or a person around the autonomous vehicle. The information presentation device presents action-inducing information. The action-inducing information is for inducing a user of the autonomous vehicle or a person around the autonomous vehicle who is captured by the image-capturing device to take an action.

In order to realize coexistence and cooperation with people in an autonomous vehicle, it is important to establish a relationship between an autonomous vehicle and people. In the autonomous vehicle described above, the information presentation device presents action-inducing information so as to induce a user of the autonomous vehicle or a person around the autonomous vehicle who is captured by the image-capturing device to take an action. Accordingly, it is possible to change a state or an action of a user of the autonomous vehicle or of a person around the autonomous vehicle who is captured by the image-capturing device. As a result, relationships between an autonomous vehicle and people can be established. Consequently, the autonomous vehicle described above can coexist and cooperate with people.

In the autonomous vehicle described above, a hardware structure and/or a software structure can be of low complication. More specifically, the autonomous vehicle described above can induce a user of the autonomous vehicle or a person around the autonomous vehicle who is captured by the image-capturing device to take an action according to the action-inducing information. Consequently, it is minimally required for the autonomous vehicle to have a hardware structure and/or a software structure capable of recognizing an action according to the action-inducing information. In other words, it is not necessary for autonomous vehicle to have the hardware and/or the software structure capable of recognizing a wide variety of actions. Therefore, in the autonomous vehicle described above, the hardware structure and/or the software structure can be of low complication.

The autonomous vehicle according to one embodiment of the present teaching may move automatically without operator's manipulation. The autonomous vehicle may move on the ground, in water or on water, or in the air.

In the autonomous vehicle according to one embodiment of the present teaching, the deck may have, for example, a surface with which a person and/or baggage can have contact and that can support the person and/or baggage. The deck may have, for example, a seat on which a person can be seated.

In the autonomous vehicle according to one embodiment of the present teaching, a user of the autonomous vehicle may be, for example, a person who gets in the autonomous vehicle or a person who has something to do with baggage transported by the autonomous vehicle. The person who has something to do with baggage transported by the autonomous vehicle may be, for example, one who receives baggage transported by the autonomous vehicle or one who has baggage transported by the autonomous vehicle. The transportation of baggage by the autonomous vehicle may be charged for or free of charge.

In the autonomous vehicle according to one embodiment of the present teaching, an action that induce a user of the autonomous vehicle may be, for example, for moving the autonomous vehicle or for stopping the autonomous vehicle. The action for moving the autonomous vehicle includes, for example, an action for starting the autonomous vehicle in motion. The action for starting the autonomous vehicle in motion is, for example, making a predetermined gesture while being in the vehicle, i.e. being on the deck. The predetermined gesture includes, for example, a motion using a hand or an arm. Such a motion may be, for example, a thumbs-up, raising a hand or waving a hand. The action for stopping the autonomous vehicle is, for example, making a predetermined gesture while being in the vehicle, that is, while being on the deck, or while being around the autonomous vehicle, that is, while not being on the deck. The predetermined gesture is, for example, a motion using a hand or an arm. Such a motion may be, for example, raising a hand or waving a hand.

In the autonomous vehicle according to one embodiment of the present teaching, a person around the autonomous vehicle includes, for example, a person who obstructs the movement of the autonomous vehicle and a person who approaches the autonomous vehicle. The person who approaches the autonomous vehicle includes, for example, one who is interested in the autonomous vehicle.

In the autonomous vehicle according to one embodiment of the present teaching, the action for inducing a person around the autonomous vehicle may be one, for example, to have a person move so as not to block the movement of the autonomous vehicle, or to have a person use the autonomous vehicle.

In the autonomous vehicle according to one embodiment of the present teaching, the action-inducing information may include, for example, instructions for inducing a user of the autonomous vehicle or a person around the autonomous vehicle who is captured by the image-capturing device to take an action. The action-inducing information may be, for example, an image or audio. The presentation of the action-inducing information may be, for example, a display of an image showing the action-inducing information or output of audio indicating the action-inducing information.

In the autonomous vehicle according to one embodiment of the present teaching, the action-inducing device may include, for example, a control device for controlling the information presentation device.

In the autonomous vehicle according to one embodiment of the present teaching, the image-capturing device may capture a user of the autonomous vehicle who is on the deck.

In the autonomous vehicle according to one embodiment of the present teaching, the imaging-capturing device may capture a user of the autonomous vehicle who is around the autonomous vehicle.

In the autonomous vehicle according to one embodiment of the present teaching, the image-capturing device may capture the action of a person to whom the action-inducing information is presented from the information presentation device. The action-inducing device may further include an action recognition device. The action recognition device recognizes an action of the person who is captured by the image-capturing device and to whom action-inducing information is presented from the information presentation device.

In the autonomous vehicle according to one embodiment of the present teaching, the action recognition device recognizes, for example, a part of a body of a person captured by the imaging-capturing device, and recognizes an action based on such as the position and shape of the recognized part of the body.

The autonomous vehicle according to one embodiment of the present teaching may further comprise an automatic driving device. The automatic driving device moves or stops the autonomous vehicle based on an action recognized by the action recognition device.

In the autonomous vehicle according to one embodiment of the present teaching, the automatic driving device may start the autonomous vehicle in motion based on an action recognized by the action recognition device.

In the autonomous vehicle according to one embodiment of the present teaching, the action-inducing device may further include a person-identifying device. The person-identifying device identified a person who is captured by the image-capturing device. The information presentation device may present the action-inducing information to induce the person identified by the person-identifying device to take an action.

In the autonomous vehicle according to one embodiment of the present teaching, identification of a person by the person-identifying device is performed by, for example, a face authentication technique. The face data that is used for the face authentication technique may be obtained, for example, when the user of the autonomous vehicle is registered in advance.

In the autonomous vehicle according to one embodiment of the present teaching, the information presentation device may present the action-inducing information so as to induce the person captured by the image-capturing device to receive baggage on the deck or to put baggage on the deck.

In the autonomous vehicle according to one embodiment of the present teaching, the image-capturing device may capture the deck in order to determine whether the action has been taken in accordance with the action-inducing information presented by the information presentation device.

In the autonomous vehicle according to one embodiment of the present teaching, the information presentation device may present the action-inducing information so as to further induce the action after determining whether the action has been taken in accordance with the action-inducing information presented previously.

In the autonomous vehicle according to one embodiment of the present teaching, when the information presentation device presents the action-inducing information so as to further induce the action, the information presentation device may present the same action-inducing information as previously presented one or may present the different action-inducing information from previously presented one.

In the autonomous vehicle according to one embodiment of the present teaching, the information presentation device may include an information display device. The information display device displays an action-inducing image, which is the action-inducing information, so as to induce the person captured by the image-capturing device to take an action. The image-capturing device and the information display device may be arranged such that a person who is captured by the image-capturing device can see the image-capturing device and the information display device simultaneously.

In the autonomous vehicle described above, a user of the autonomous vehicle or a person around the autonomous vehicle sees the image-capturing device when the user or the person looks at the information display device. This results in less overlap between faces of a plurality of people when the image-capturing device captures a plurality of people. Thus, the image-capturing device can easily capture the face of a user of the autonomous vehicle or a person around the autonomous vehicle. In addition, the autonomous vehicle can transmit more information to the user of the autonomous vehicle or the person around the autonomous vehicle because the user of the autonomous vehicle or the person around the autonomous vehicle looks at the information display device.

In the autonomous vehicle according to one embodiment of the present teaching, the information presentation device may further include an audio output device. The audio output device outputs an action-inducing audio, which is action-inducing information, so as to induce the person who is captured by the image-capturing device to take an action. The audio output device may output the action-inducing audio such that a person who is captured by the image-capturing device feels that the action-inducing audio is outputted from a place where the image-capturing device and the information display device are arranged.

According to the autonomous vehicle described above, a user of the autonomous vehicle or a person around the autonomous vehicle sees the image-capturing device when an audio is outputted. This results in less overlap between faces of a plurality of people when the image-capturing device captures a plurality of people. Thus, the image-capturing device can easily capture the face of a user of the autonomous vehicle or a person around the autonomous vehicle. In addition, the autonomous vehicle can transmit more information to the user of the autonomous vehicle or the person around the autonomous vehicle because the user of the autonomous vehicle or the person around the autonomous vehicle looks at the information display device.

The autonomous vehicle according to one embodiment of the present teaching may be a small autonomous vehicle.

The autonomous vehicle according to one embodiment of the present teaching may be a low-speed autonomous vehicle.

The foregoing objects and other objects, features, aspects and advantages of the present teaching will become more apparent from the following detailed description of embodiments of the present teaching in conjunction with the accompanying drawings.

As used herein, the term "and/or" includes any or all combinations of one or more related items that are described.

As used herein, the term "include, including", "comprise, comprising" or "having" and variations thereof identify the presence of the described features, steps, operations, elements, components and/or equivalents thereof, but can include one or more of the steps, operations, elements, components, and/or groups thereof.

Unless otherwise defined, all terms (including technical and scientific terms) used herein have the same meaning as commonly understood by one of ordinary skill in the art to which the present teaching belongs.

Terms such as those defined in commonly used dictionaries should be interpreted as having a meaning consistent with that in the context of the relevant art and this disclosure, and not interpreted in an ideal or overly formal sense unless explicitly defined herein.

In the description of the present teaching, it is understood that a number of techniques and steps are disclosed. Each of these has a separate benefit, and each may be used with one or more or in some cases all of the other disclosed techniques. Therefore, for clarity, this description refrains from unnecessarily repeating all possible combinations of individual steps. Nevertheless, the description and claims should be read with the understanding that all such combinations are within the scope of the present teaching and claims.

For purposes of illustration, a lot of specific details will be following in order to provide a complete understanding of the present teaching. However, it will be apparent to those skilled in the art that the teaching can be practiced without these particular details. The present disclosure should be given by way of illustration of the teaching and is not intended to be limiting to the specific embodiments in the following drawings or description.

Effect of the Teaching

According to the present teaching, in the autonomous vehicle that moves automatically without operator's manipulation, a hardware structure and/or a software structure can be of low complication.

BRIEF DESCRIPTION OF THE DRAWINGS

FIG. 4 is a side view of a vehicle 101, 101 d.

FIG. 24 is a side view of the vehicle 101 a, 101 b, and 101 c.

EMBODIMENTS FOR CARRYING OUT THE TEACHING

The autonomous vehicle according to one embodiment of the present teaching will be described in detail below with reference to the drawings. The embodiments described below are merely an example. The present teaching is not to be limited at all by the embodiments described below.

Figure 1:
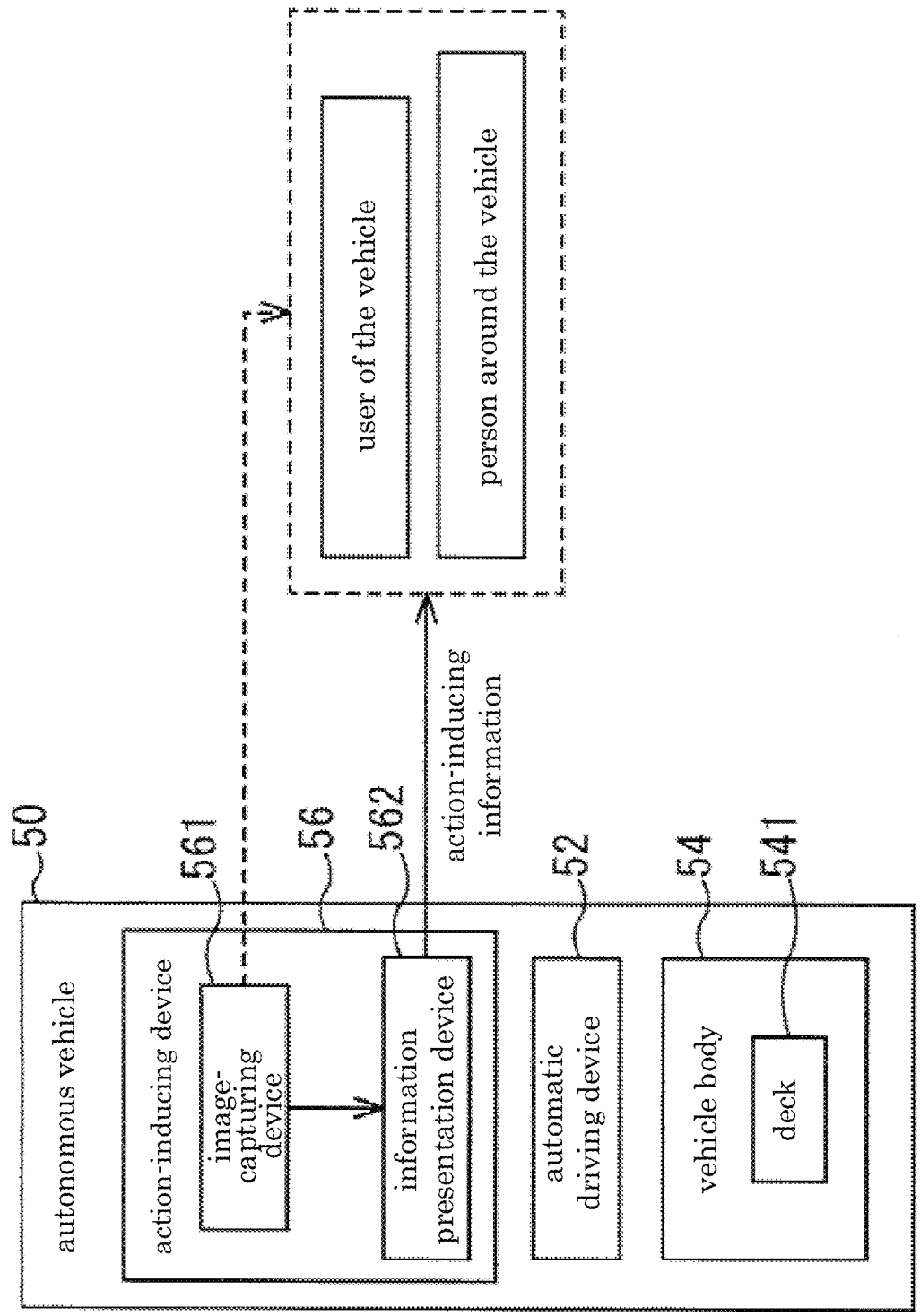
FIG. 1 is a block diagram schematically illustrating components of the autonomous vehicle according to one embodiment of the present teaching.

The autonomous vehicle 50 according to one embodiment of the present teaching will be described with reference to FIG. 1. FIG. 1 is a block diagram schematically illustrating the components of the autonomous vehicle 50.

The autonomous vehicle 50 may move automatically without any operator's manipulation. The autonomous vehicle 50 may move on the ground, in water or on water, or in the air.

For example, the autonomous vehicle 50 may be a small autonomous vehicle. The small autonomous vehicle may, for example, meet at least one of the following requirements 1~3.

Requirement 1: The riding capacity of the autonomous vehicle 50 is 10 or less.

Requirement 2: The maximum loading capacity of the autonomous vehicle 50 is 1 ton or less.

Requirement 3: The total length of the autonomous vehicle 50 is 5 meters or less, and the total width of the autonomous vehicle 50 is 1.5 meters or less.

The autonomous vehicle 50 may be, for example, a low-speed autonomous vehicle. The low-speed autonomous vehicle is one that moves at less than 60 km/h. Preferably, the low-speed autonomous vehicle moves at less than 40 km/h. More preferably, the low-speed autonomous vehicle moves at less than 30 km/h. Even more preferably, the low speed autonomous vehicle moves at less than 20 km/h.

The autonomous vehicle 50 includes an automatic driving device 52, a vehicle body 54, and an action-inducing device 56. These will be described below.

The automatic driving device 52 moves the vehicle body 54 without any operator's manipulation. The automatic driving device 52 moves the vehicle body 54 without any operator's manipulation, so that the autonomous vehicle 50 moves automatically without any operator's manipulation. In addition, the automatic driving device 52 may have a motion of preparing for moving the vehicle body 54 without any operator's manipulation.

The automatic driving device 52 stops the vehicle body 54 without any operator's manipulation. The automatic driving device 52 stops the vehicle body 54 without any operator's manipulation, so that the autonomous vehicle 50 stops without any operator's manipulation. In addition, the automatic driving device 52 may have a motion of preparing for stopping the vehicle body 54 without any operator's manipulation.

The automatic driving device 52 is supported by the vehicle body 54. The automatic driving device 52 includes, for example, a steering device, a driving force generator, a braking force generator, and an automatic driving control device.

The steering device changes the direction in which the vehicle body 54 moves, that is, the direction in which the autonomous vehicle 50 moves.

The driving force generator generates, for example, a driving force for moving the vehicle body 54. The driving force generator includes, for example, an electric motor, which works as a driving source.

The braking force generator generates a braking force for stopping the vehicle body 54, or, the autonomous vehicle 50. The braking force generator is, for example, a braking device. The braking device includes, for example, a brake disc and a caliper.

The automatic driving control device controls the steering device, the driving force generation device, and the braking force generation device. The automatic driving control device controls the steering device, the driving force generator, and the braking force generator, for example, by getting and processing information regarding an environment in which the autonomous vehicle 50 is present. Information regarding the environment in which the autonomous vehicle 50 is present includes, for example, information regarding an action of a user of the autonomous vehicle 50 or a person around the autonomous vehicle 50.

The vehicle body 54 includes a deck 541. The deck 541 is used for a person and/or baggage to be on. The deck 541 may have, for example, a surface with which a person and/or baggage can have contact and that can support the person and/or baggage. For example, the deck 541 may have a seat on which a person can be seated. The deck 541 defines, for example, the lower end of a cabin containing a person and/or baggage. The cabin forms, for example, a space for containing a person and/or baggage. For example, the space formed by the cabin may be connected to a space around the vehicle body 54. The entrance of the cabin may or may not be provided with a door for opening and closing the entrance.

The action-inducing device 56 induces a user of the autonomous vehicle 50 or a person around the autonomous vehicle 50 to take an action. The action-inducing device 56 includes an image-capturing device 561 and an information presentation device 562.

A user of the autonomous vehicle 50 may be, for example, a person who gets in the autonomous vehicle 50 or a person who has something to do with baggage transported by the autonomous vehicle 50. The person who has something to do with baggage transported by the autonomous vehicle 50 may be, for example, a person who receives baggage transported by the autonomous vehicle 50 or a person who has baggage transported by the autonomous vehicle 50. The transportation of baggage by the autonomous vehicle 50 may be charged for or free of charge.

An action for inducing the user of the autonomous vehicle 50 may be, for example, the action for moving the autonomous vehicle 50 or for stopping the autonomous vehicle 50. The action for moving the autonomous vehicle 50 include, for example, an action for starting the autonomous vehicle 50 in motion. The action for starting the autonomous vehicle 50 in motion is making a predetermined gesture while being in the autonomous vehicle 50, that is, while being on the deck 541. The predetermined gesture is, for example, a motion using a hand or an arm. Such a motion may be, for example, a thumbs-up, raising a hand, or waving a hand. The action for stopping the autonomous vehicle 50 is, for example, making a predetermined gesture while being in the autonomous vehicle 50, that is, while being on the deck 541, or while being around the autonomous vehicle 50, that is, while not being on the deck 541. The predetermined gesture is, for example, a motion using a hand or an arm. Such a motion may be, for example, raising a hand or waving a hand.

A person around the autonomous vehicle 50 includes, for example, one who obstructs the movement of the autonomous vehicle 50 and one who approaches the autonomous vehicle 50. The person who approaches the autonomous vehicle 50 include, for example, one who is interested in the autonomous vehicle 50.

The action of inducing the person around the autonomous vehicle 50 may be, for example, to move so as not to block the movement of the autonomous vehicle or to make a use of the autonomous vehicle.

The image-capturing device 561 captures a user of the autonomous vehicle 50 or a person around the autonomous vehicle 50. The image-capturing device 561 may be, for example, a CCD (Charge Coupled Device) image sensor or a CMOS (Complementary Metal Oxide Semiconductor) image sensor. The image-capturing device 561 may capture the action of the person to whom the action-inducing information is presented by the information presentation device 562.

The information presentation device 562 presents action-inducing information. The action-inducing information is for inducing a user of the autonomous vehicle 50 or a person around the autonomous vehicle 50 who is captured by the image-capturing device 561 to take an action. The action-inducing information includes, for example, an instruction for inducing a user of the autonomous vehicle 50 or a person around the autonomous vehicle 50 who is captured by the image-capturing device 561 to take an action.

The information presentation device 562 may include an information display device. The information display device displays an action-inducing image, which is action-inducing information, so as to induce the person captured by the image-capturing device 561 to take an action.

The information display device may be arranged so that a person who is captured by the image-capturing device 561 can see the information display device together with the image-capturing device 561. In other words, the information display device and the image-capturing device 561 may be arranged so that a person who is captured by the image-capturing device 561 can see them at the same time. One embodiment in which the information display device and the image-capturing device 561 can be seen simultaneously includes, for example, one in which the information display device and the image-capturing device 561 are arranged adjacent to each other. In such a case, a user of the autonomous vehicle 50 or a person around the autonomous vehicle 50 sees the image-capturing device 561 when looking at the information display device. This results in less overlap between faces of a plurality of people when an image-capturing device 561 captures a plurality of people. Thus, the image-capturing device 561 can easily capture the face of the user of the autonomous vehicle 50 or the person around the autonomous vehicle 50. In addition, the autonomous vehicle 50 can transmit more information to a user of the autonomous vehicle 50 or a person around the autonomous vehicle 50 because the user of the autonomous vehicle 50 or the person around the autonomous vehicle 50 looks at the information display device.

The information presentation device 562 may include an audio output device. The audio output device outputs action-inducing audio, which is action-inducing information, so as to induce the person captured by the image-capturing device 561 to take an action.

The audio output device may output the action-inducing audio such that the person who is captured by the image-capturing device 561 feels that the action-inducing audio is outputted from a place where the image-capturing device 561 and the information display device are arranged. In this case, when audio is outputted, a user of the autonomous vehicle 50 or a person around the autonomous vehicle 50 sees the image-capturing device 561. This results in less overlap between faces of a plurality of people when the image-capturing device 561 captures a plurality of people. Thus, the image-capturing device 561 can easily capture the face of the user of the autonomous vehicle 50 or the person around the autonomous vehicle 50. In addition, because a user of the autonomous vehicle 50 or a person around the autonomous vehicle 50 looks at the information display device, the autonomous vehicle 50 can transmit more information to a user of the autonomous vehicle 50 or a person around the autonomous vehicle 50.

The image-capturing device 561 may capture a user of the autonomous vehicle 50 who is on the deck 541. In other words, the image-capturing device 561 may capture a user of the autonomous vehicle 50 who is in the autonomous vehicle 50.

The image-capturing device 561 may capture a user of the autonomous vehicle 50 who is around the autonomous vehicle 50. In this case, the information presentation device 56 may present the action-inducing information to the person who is captured by the image-capturing device 561 so as to induce the person to receive baggage that is on the deck 541 or to induce the person to put baggage on the deck 541. Further, the image-capturing device 561 may capture the deck 541 to determine whether the action has been taken in accordance with the action-inducing information presented from the information presentation device 56. The information presentation device 561 may present the action-inducing information so as to further induce an action after determining whether the action has been taken in accordance with the action-inducing information presented previously. When the information presentation device 56 presents the action-inducing information so as to further induce the action, the information presentation device 56 may present the same action-inducing information as previously presented one or may present the different action-inducing information from previously presented one.

The autonomous vehicle 50 can coexist with and cooperate with people. The reasons for this are as follows.

In order to realize coexistence and cooperation with people in an autonomous vehicle, it is important to establish a relationship between autonomous vehicles and people. In the autonomous vehicle 50, an information presentation device 562 presents action-inducing information so as to induce a user of the autonomous vehicle 50 or a person around the autonomous vehicle 50 who is captured by an image-capturing device 561 to take an action. Therefore, it is possible to change a state or an action of the user of the autonomous vehicle 50 or a person around the autonomous vehicle 50 who is captured by the image-capturing device 561. As a result, the relationships between the autonomous vehicle 50 and people can be established. Therefore, the autonomous vehicle 50 can coexist with and cooperate with people.

In the automatic operation vehicle 50, a hardware structure and/or a software structure can be of low complication. The reasons are as follows.

The autonomous vehicle 50 can induce a user of the autonomous vehicle 50 or a person around the autonomous vehicle 50 who is captured by the image-capturing device 561 to take an action according to the action promotion information. Consequently, the autonomous vehicle 50 may have a hardware structure and/or a software structure capable of recognizing the action according to the action-inducing information. In other words, it is not necessary for the autonomous vehicle 50 to have a hardware and/or a software structure capable of recognizing a wide variety of actions. Therefore, in the automatic operation vehicle 50, the hardware structure and/or the software structure can be of low complication.

Modification 1 of the Embodiment

Figure 2:
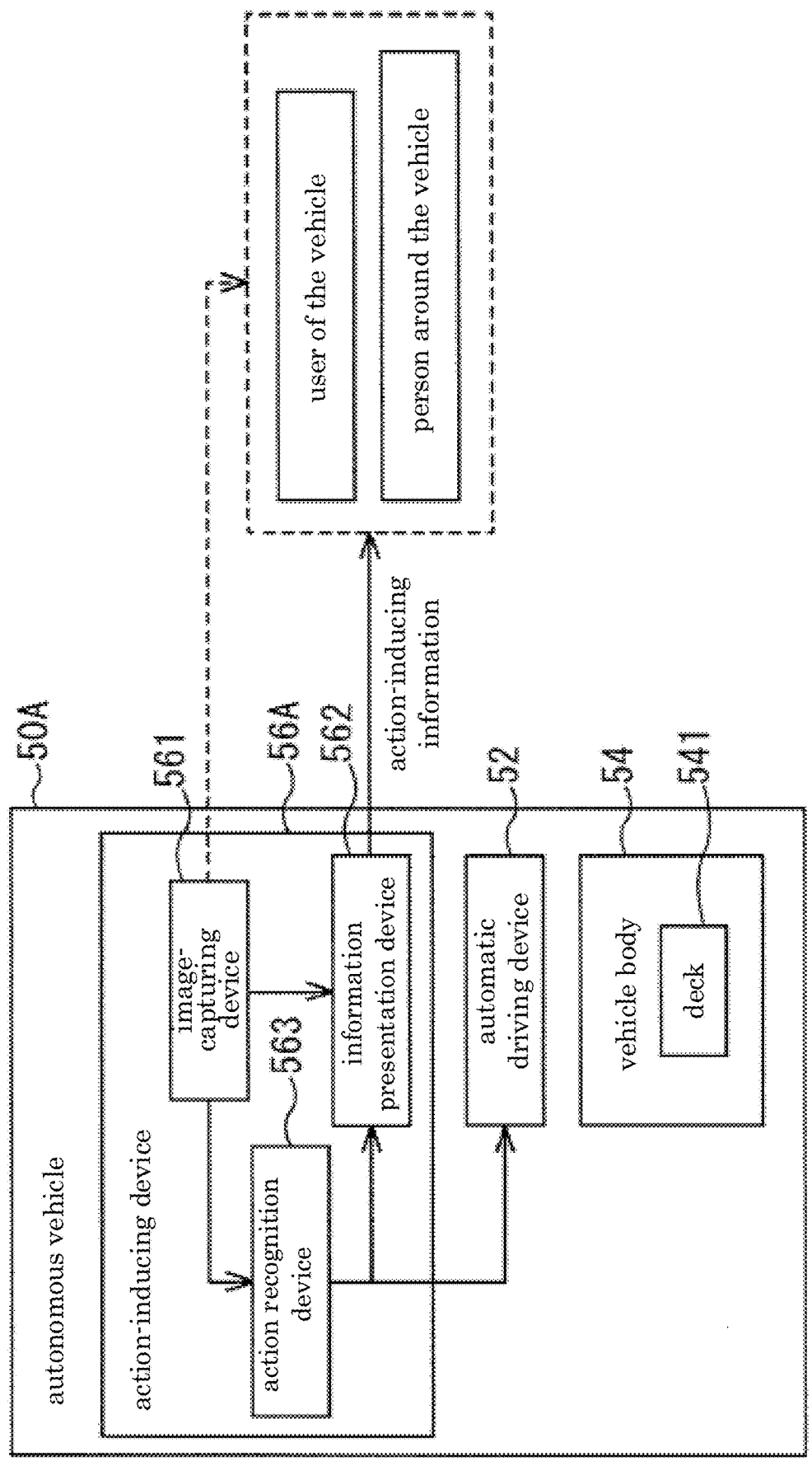
FIG. 2 is a block diagram schematically illustrating components of the autonomous vehicle according to modification 1 of the embodiment of the present teaching.

The autonomous vehicle 50A according to modification 1 of the embodiment of the present teaching will be described with reference to FIG. 2 as follows. FIG. 2 is a block diagram schematically showing the components of the autonomous vehicle 50A.

The autonomous vehicle 50A is different from the autonomous vehicle 50 in that the autonomous vehicle 50A comprises the action-inducing device 56A instead of the action-inducing device 56. The action-inducing device 56A is different from the action-inducing device 56 in that the action-inducing device 56A further comprises the action recognition device 563.

The action recognition device 563 recognizes the action of the person who is captured by the image-capturing device 561 and to whom action-inducing information is presented from the information presentation device 562. In other words, in the autonomous vehicle 50A, the image-capturing device 561 captures the action of the person to whom the action-inducing information is presented from the information presentation device 562. The action recognition device 563 recognizes, for example, a part of a body of a person captured by the image-capturing device 561, and recognizes an action based on such as the position and the shape of the recognized part of the body.

In the autonomous vehicle 50A, the automatic driving device 52 may move or stop the autonomous vehicle 50A based on an action recognized by the action recognition device 563.

In the autonomous vehicle 50A, the automatic driving device 52 may start the autonomous vehicle 50A in motion based on an action recognized by the action recognition device 563.

In the autonomous vehicle 50A, the information presentation device 562 may present the action-inducing information so as to induce a person captured by the image-capturing device 561 to take an action based on an action recognized by the action recognition device 563.

The autonomous vehicle 50A can also provide the same effects as those of the embodiment described above.

Modification 2 of the Embodiment

Figure 3:
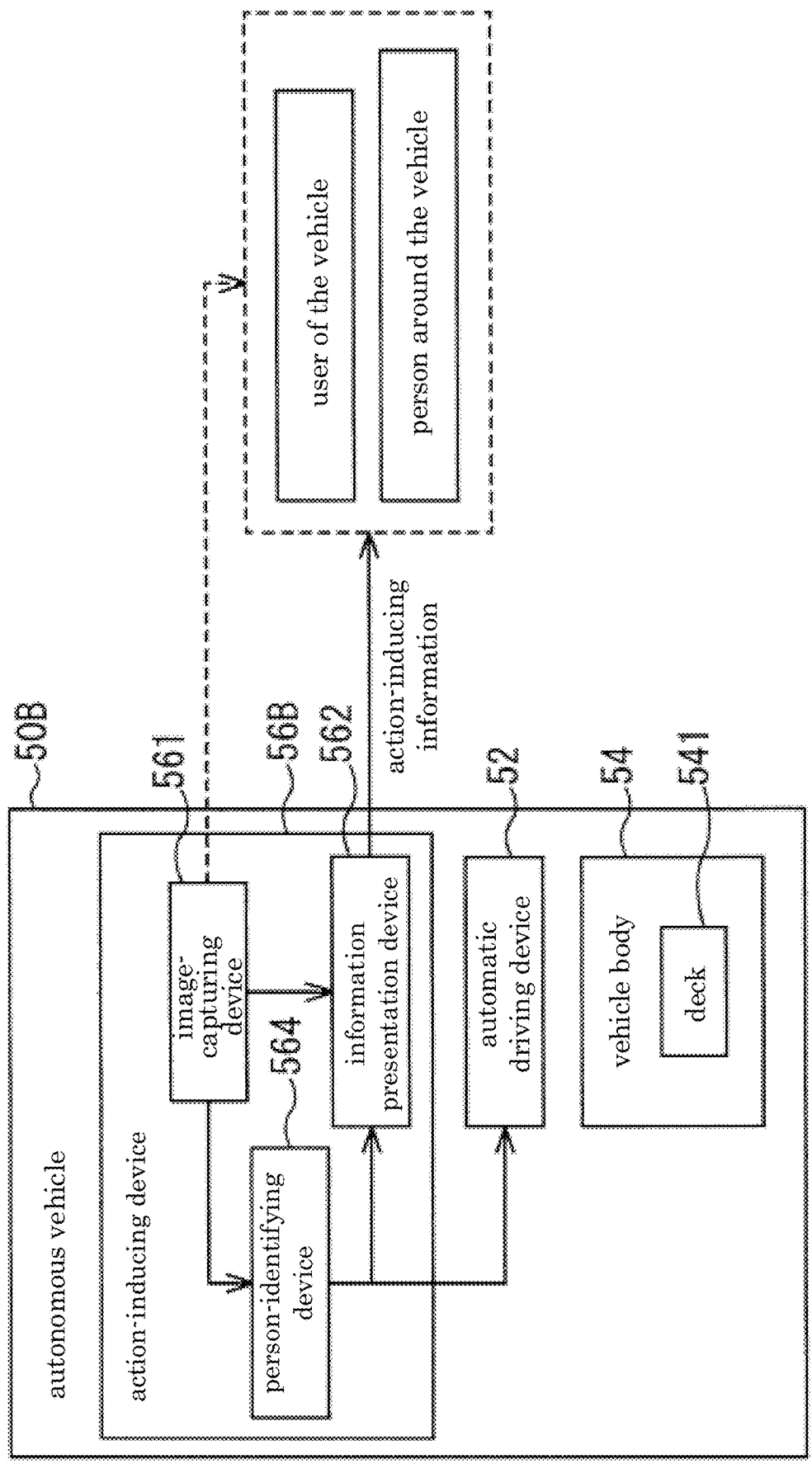
FIG. 3 is a block diagram schematically illustrating components of the autonomous vehicle according to modification 2 of the embodiment of the present teaching.

The autonomous vehicle 50B according to modification 2 of the embodiment of the present teaching will be described with reference to FIG. 3 as follows. FIG. 3 is a block diagram schematically showing the components of the autonomous vehicle 50B.

The autonomous vehicle 50B is different from the autonomous vehicle 50 in that the autonomous vehicle 50B comprises the action-inducing device 56B instead of the action-inducing device 56. The action-inducing device 56B is different from the action-inducing device 56 in that the action-inducing device 56B further comprises the person-identifying device 564.

The person-identifying device 564 identifies a person captured by the image-capturing device 561. The information presentation device 562 may present the action-inducing information so as to induce the person identified by the person-identifying device 564 to take an action. The identification of the person by the person-identifying device 564 is performed, for example, by a face authentication technique. A face data that is used for the face authentication technique may be obtained, for example, when the user of the autonomous vehicle 50B is registered in advance.

The autonomous vehicle 50B can also provide the same effects as those of the embodiments described above.

Other Modifications of the Embodiment

For example, in the autonomous vehicle 50A, the action-inducing device 56A may further include the person-identifying device 564. For example, in the autonomous vehicle 50B, the action-inducing device 56B may further include the action recognition device 563.

Example 1 of the Embodiment (Overall Configuration of the Vehicle)

Figure 5:
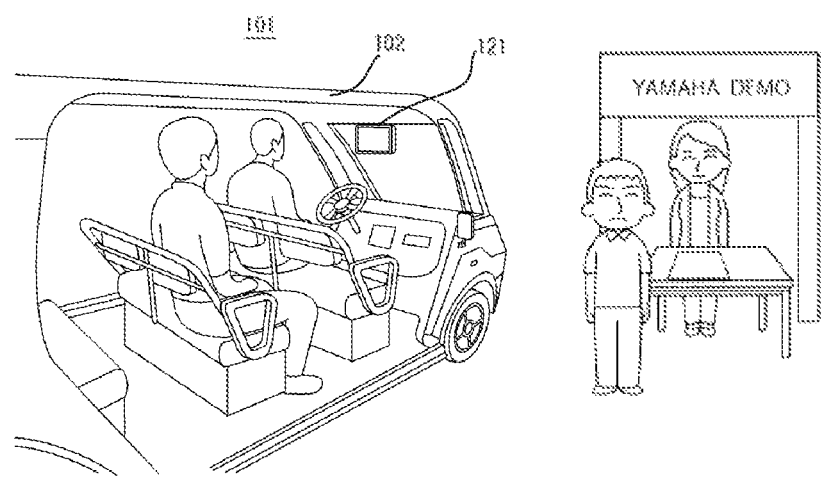
FIG. 5 shows an interior of the vehicle 101.
Figure 6:
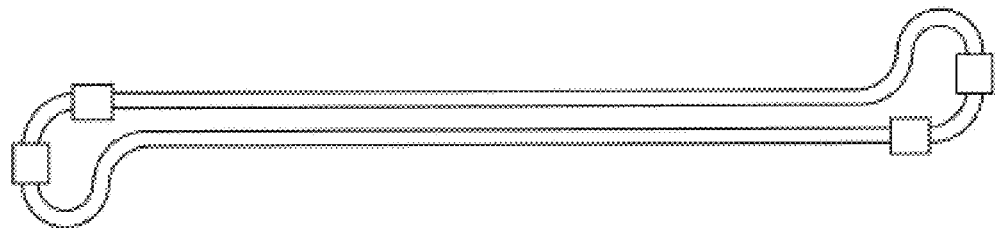
FIG. 6 shows a route along which the vehicle 101 travels.

The overall configuration of the vehicle, which is the autonomous vehicle according to Example 1 of the embodiment of the present teaching, will be described below with reference to the drawings. FIG. 4 is a side view of vehicle 101. In FIG. 4, the vehicle 101, 101d is schematically illustrated, and functional blocks are also described. FIG. 5 shows the interior of the vehicle 101. FIG. 6 shows a route along which the vehicle 101 travels.

Hereinafter, the front direction of the vehicle 101 is defined as the front direction F. The front direction F is identical with the traveling direction of the vehicle 101. The back direction of the vehicle 101 is defined as the back direction B. The left direction of the vehicle 101 is defined as the left direction L. The right direction of the vehicle 101 is defined as the right direction R. The up direction of the vehicle 101 is defined as the up direction U. The down direction of the vehicle 101 is defined as the down direction D. The front-back direction of the vehicle 101 is defined as the front-back direction FB. The left-right direction of the vehicle 101 is defined as the left-right direction LR. The up-down direction of the vehicle 101 is defined as the up-down direction UD.

In this specification, the traveling direction of the vehicle 101 is the direction in which the vehicle 101 travels by the rotation of the wheels in normal use, and does not include the direction in which the vehicle 101 travels by the reverse rotation of the wheels that happens temporarily. When the vehicle 101 is able to switchback (a bidirectional vehicle), the reverse rotation of the wheels can change the traveling direction of the vehicle 101 to the reverse direction.

In the present specification, an axis line or a member extending in the front-back direction does not necessarily indicate only an axis line or a member that is parallel to the front-back direction. The axis or the member extending in the front-back direction includes an axis line or a member that is inclined in the range of ±45° with respect to the front-back direction. Similarly, the axis or a member extending in the up-down direction includes an axis line or a member that is inclined in the range off ±45° with respect to the up-down direction. The axis or a member extending in the left-right direction includes an axis or a member that is inclined in the range off ±45° with respect to the left-right direction.

When any two members in this specification are defined as the first member and the second member, the relation between any two members has the following meaning. In this specification, a case that the first member is supported by the second member includes a case where the first member is attached to the second member so as not to be movable with respect to the second member (i.e., fixed) and a case where the first member is attached to the second member so as to be movable with respect to the second member. In addition, a case that the first member is supported by the second member includes both a case where the first member is directly attached to the second member and a case where the first member is attached to the second member via a third member.

In this specification, a configuration that the first member and the second member are arranged in the front-back direction refers to the following; when the first member and the second member are viewed in the direction perpendicular to the front-back direction, both the first member and the second member are arranged on an any straight line indicating the front-back direction. In this specification, a configuration that the first member and the second member are arranged in the front-back direction when viewed in the up or the down direction refers to the following; when the first member and the second member are viewed in the up or the down direction, both the first member and the second member are arranged on an any straight line indicating the front-back direction. In this case, when the first member and the second member are viewed in the left or right direction that is different from the up and down direction, it is not necessary for either one of the first member or the second member to be arranged on an any straight line indicating the front-back direction. In addition, the first member and the second member may be in contact with each other. The first member may be apart from the second member. A third member may be present between the first member and the second member. This definition also applies to directions other than the front-back direction.

In this specification, a configuration that the first member is arranged in front of the second member refers to the following; at least a part of the first member is arranged within a region where the second member passes when the second member translates forward. Therefore, the first member may be within the region where the second member passes when the second member translates forward, or may project from the region where the second member passes when the second member translates forward. In this case, the first member and the second member are arranged in the front-back direction. This definition also applies to directions other than the front-back direction.

In this specification, a configuration that the first member is arranged in front of the second member when viewed in the left or right direction refers to the following; the first member and the second member are arranged in the front-back direction when viewed in the left or right direction. In this definition, the first member and the second member may not be arranged in the front-back direction as viewed in three dimensions. This definition applies to directions other than the front-back direction.

In this specification, a configuration that the first member is arranged in front of the second member refers to the following; the first member is arranged in front of a plane that passes through the front end of the second member and orthogonal to the front-back direction. In this case, the first member and the second member may or may not be arranged in the front-back direction. This definition also applies to directions other than the front-back direction.

In this specification, unless otherwise defined, each part of the first member is defined as follows. The front part of the first member means the front half of the first member. The back part of the first member means the back half of the first member. The left part of the first member means the left half of the first member. The right part of the first member means the right half of the first member. The upper part of the first member means the upper half of the first member. The lower part of the first member means the lower half of the first member. The upper end of the first member means the end of the upper of the first member. The lower end of the first member means the end of the lower of the first member. The front end of the first member means the end of the front of the first member. The back end of the first member means the back of the end of the first member. The left end of the first member means the end of the left of the first member. The right end of the first member means the end of the right of the first member. The upper end part of the first member means the upper end of the first member and the vicinity thereof. The lower end part of the first member means the lower end of the first member and the vicinity thereof. The front end part of the first member means the front end of the first member and the vicinity thereof. The back end part of the first member means the back end of the first member and the vicinity thereof. The left end part of the first member means the left end of the first member and the vicinity thereof. The right end part of the first member means the right end of the first member and the vicinity thereof. The first member means a member that constitutes the vehicle 101.

In this specification, when a component (a member, a space or an opening) is formed (located or provided) between the first member and the second member, it means that the component is present between the first member and the second member in a direction in which the first member and the second member are arranged. However, the component may or may not project from the first member or the second member in a direction orthogonal to a direction in which the first member and the second member are arranged.

The vehicle 101 is an autonomous vehicle. Consequently, the vehicle 101 moves automatically without any driver's operation. The vehicle 101 is a small vehicle. The small vehicle is, for example, a vehicle that meets any of the following requirements.

The riding capacity of the vehicle is 10 or less.
The maximum loading capacity of the vehicle is 1 ton or less.
The total length of the vehicle is 5 meters or less, and the total width of the vehicle is 1.5 meters or less.

The vehicle 101 is a low-speed traveling vehicle. A low-speed traveling vehicle is a vehicle that travels at less than 60 km/h. Preferably, the low-speed traveling vehicle travels at less than 40 km/h. More preferably, the low-speed traveling vehicle travels at less than 30 km/h. Even more preferably, the low-speed traveling vehicle travels at less than 20 km/h.

Moreover, the vehicle 101 is an open vehicle. As used herein, an open vehicle means a vehicle in which the interior of the vehicle 101 and the exterior of the vehicle 101 are not completely shielded. Therefore, the window of the vehicle 101 is not closed by such as glass.

As shown in FIG. 4, the vehicle 101 comprises a vehicle body 102, a plurality of wheels 104, a vehicle motion device 107, a plurality of seats 112, an automatic driving control device 114, an action-inducing control device 115, an action recognition device 116, a vehicle action-executing device 117, a person-identifying device 118, an image-capturing device 120, an information display device 121, an audio output device 122, and a LIDAR (Light Detection and Ranging) 123.

In the present example 1, the automatic driving device includes the vehicle motion device 107, the automatic driving control device 114, and the vehicle action-executing device 117. In the present example 1, the action-inducing device includes the action-inducing control device 115, the action recognition device 116, the person-identifying device 118, the image-capturing device 120, the information presentation device 121, and the audio output device 122. In the present example 1, the information presentation device includes the information display device 121 and the audio output device 122.

The vehicle body 102 is able to carry on a person and/or baggage. The vehicle body 102 is a vehicle body frame and an exterior of the vehicle 101. The vehicle body 102 has a box shape. Thus, the vehicle body 102 forms a cabin space Sp. The cabin space Sp is for accommodating a person and/or baggage. The vehicle body 102 includes a deck. The deck defines, for example, the lower end of the cabin space Sp.

As shown in FIG. 4, a plurality of wheels 104 is supported by the vehicle body 102. A plurality of wheels 104 can rotate about an axle. The wheel 104 includes a tire and a wheel body that holds a tire. A plurality of wheels 104 includes a left front wheel 104 FL, a right front wheel 104 FR, a left rear wheel 104 BL, and a right rear wheel 104 BR. The left front wheel 104 FL is arranged at the left part and front part of the vehicle body 102. The front left wheel 104 FL can rotate about a left front kingpin axis (not shown) extending in the up-down direction UD. The right front wheel 104FR is arranged at the right part and front part of the vehicle body 102. The right front wheel 104 FR can rotate about a right front kingpin axis (not shown) extending in the up-down direction UD. Thus, the left front wheel 104 FL and the right front wheel 104 FR are steering wheels. The left rear wheel 104 BL is arranged at left part and back part of the vehicle body 102. The right rear wheel 104 BR is arranged at right part and back part of the vehicle body 102.

The vehicle motion device 107 is supported by the vehicle body 102. The vehicle motion device 107 moves the vehicle 101. The motion of vehicle 101 is "traveling", "turning", and "stopping" of the vehicle 101. Specifically, moving the vehicle 101 includes moving the vehicle 101 forward, backing the vehicle 101, turning left while moving the vehicle 101 forward, turning right while moving the vehicle 101 forward, turning left while backing the vehicle 101, turning right while backing the vehicle 101, starting the vehicle 101 in motion, stopping the vehicle 101, accelerating the vehicle 101, decelerating the vehicle 101. Accordingly, the vehicle motion device 107 includes the steering device 106, the driving force generator 108, and the braking force generator 110.

The steering device 106 is supported by the vehicle body 102. The steering device 106 is for steering at least one of a plurality of wheels 104. In the present example 1, the steering device 106 steers the left front wheel 104 FL and the right front wheel 104 FR. More specifically, the steering device 106 rotates the left front wheel 104 FL about the left front kingpin axis and the right front wheel 104 FR about the right front kingpin axis. For example, when the vehicle 101 turns in the left direction L while moving forward, the steering device 106 rotates the left front wheel 104 FL and the right front wheel 104 FR counterclockwise as viewed in the back direction D. For example, when the vehicle 101 turns in the right direction R while moving forward, the steering device 106 rotates the left front wheel 104 FL and the right front wheel 104 FR clockwise as viewed in the down direction D. The steering device 106 is comprised of, for example, an electric motor, a reduction gear, and a rack-and-pinion type steering gear mechanism. However, the steering gear mechanism is not limited to a rack-and-pinion type steering gear mechanism, and may be, for example, a recirculated ball type steering gear mechanism.

The driving force generator 108 generates a driving force for driving the vehicle 101. In the present example 1, the driving force generator 108 rotates the left rear wheel 104 BL and the right rear wheel 104 BR.

Therefore, the left rear wheel 104 BL and the right rear wheel 104 BR are driving wheels. The driving force generator 108 is, for example, an engine or an electric motor. Also, the driving force generator 108 may be a hybrid power source in which an engine and an electric motor are combined. The braking force generator 110 generates braking force for braking the vehicle body 102. The braking force generator 110 converts kinetic energy, for example, of the left front wheel 104 FL, the right front wheel 104 FR, the left rear wheel 104 BL and the right rear wheel 104 BR into thermal energy by friction.

A plurality of seats 112 is supported by the vehicle body 102. The seats 112 are seated by vehicle users, who are users of the vehicle 101. A plurality of seats 112 includes a left front seat 112 FL, a right front seat 112 FR, a left middle seat 112 ML, a right middle seat 112 MR, a left back seat 112 BL, and a right back seat 112 BR.

The left front seat 112 FL, the left middle seat 112 ML, and the left back seat 112 BL are arranged in the left part of the cabin space Sp. The left front seat 112 FL, the left middle seat 112 ML, and the left back seat 112 BL are arranged in this order from the front to the back. Each of the left front seat 112 FL, the left middle seat 112 ML, and the left back seat 112 BL are arranged such that passengers seated on each of the left front seat 112 FL, the left middle seat 112 ML, and the left back seat 112 BL look forward.

The right front seat 112 FR, the right middle seat 112 MR, and the right back seat 112 BR are arranged in the right part of the cabin space Sp. The right front seat 112 FR, the right middle seat 112 MR, and the right back seat 112 BR are arranged in this order from the front to the back. Consequently, the right front seat 112 FR is arranged on the right side of the left front seat 112 FL. The right middle seat 112 MR is arranged on the right of the left middle seat 112 ML. The right back seat 112 BR is arranged on the right of the left back seat 112 BL. Each of the right front seat 112 FR, the right middle seat 112 MR, and the right back seat 112 BR are arranged such that passengers seated on each of the right front seat 112 FR, the right middle seat 112 MR, and the right back seat 112 BR look forward.

The image-capturing device 120 is supported by the vehicle body 102. The image-capturing device 120 captures a vehicle user, who is a user of the vehicle 101 that moves automatically without operation of a driver as an operator, or captures a person around the vehicle 101. The vehicle user is a person who gets in the vehicle body 102 or uses baggage loaded on the vehicle body 102. In the present example 1, the vehicle user is a person who gets in the vehicle body 102. In particular, the image-capturing device 120 captures a vehicle-user action, which is an action of a vehicle user or a person around the vehicle 101. The vehicle-user action is a motion by the vehicle user or the person around the vehicle. In the present example 1, the vehicle-user action is a motion by the vehicle user. The vehicle-user action is a gesture made by a vehicle user or a person around the vehicle such as a motion of giving a thumbs-up of a vehicle user or a person around the vehicle, raising both hands of a vehicle user or a person around the vehicle, waving a hand of a vehicle user or a person around the vehicle, or giving way in the traveling direction to the vehicle by a person around the vehicle. In the present example 1, the vehicle-user action is a motion of giving a thumbs-up and raising a hand.

As shown in FIGS. 4 and 5, the image-capturing device 120 is arranged at the front part of the vehicle body 102. More specifically, the image-capturing device 120 is arranged in front of a plurality of seats 112. In addition, the image-capturing device 120 is arranged at the center in the left-right direction LR of the vehicle body 102. Further, the image-capturing device 120 is arranged at the same place in the up-down direction UD as the eyes of the vehicle user seated on a plurality of seats 112 or above the eyes of the vehicle user seated on a plurality of seats 112. The image-capturing device 120 is, for example, a CCD (Charge Coupled Device) image sensor or a CMOS (Complementary Metal Oxide Semiconductor) image sensor. The image-capturing device 120 outputs an image signal to the action recognition device 116 and the person-identifying device 118.

The information display device 121 displays an image to a vehicle user or a person around the vehicle 101. In the present example 1, the information display device 121 displays an image to the vehicle user. The information display device 121 is, for example, a liquid crystal display or an organic EL display. The audio output device 122 outputs audio to a vehicle user or a person around the vehicle 101. In this embodiment, the audio output device 122 outputs audio to the vehicle user. The audio output device 122 is, for example, a speaker.

Here, the image-capturing device 120 and the information display device 121 are arranged on a place where a vehicle user or a person around the vehicle 101 captured by the image-capturing device 120 can see the image-capturing device 120 and the information display device 121 simultaneously. In the present example 1, the image-capturing device 120 and the information display device 121 are arranged at a place where the vehicle user who is captured by the image-capturing device 120 can see the image-capturing device 120 and the information display device 121 at the same time. The image-capturing device 120 is integrated with the information display device 121. In other words, the image-capturing device 120 is adjacent to the information display device 121. Therefore, a vehicle user can also see the image-capturing device 120 when the user of the vehicle looks at the information display device 121.

In addition, the audio output device 122 outputs audio such that a vehicle user or a person around the vehicle 101 feels that audio is outputted from a place where the image-capturing device 120 and the information display device 121 are arranged. In the present example 1, the audio output device 122 outputs audio such that a vehicle user feels that audio is outputted from a place where the image-capturing device 120 and the information display device 121 are arranged. The audio output device 122 is integrated with the image-capturing device 120 and the information display device 121. In other words, the audio output device 122 is adjacent to the information display device 121.

The LIDAR 123 obtains information about surroundings of the vehicle 101 (such as whether there is an obstacle). The LIDAR 123 irradiates around the LIDAR 123 with a pulse-emitting laser to detect scattered light generated in an object around the vehicle 101. Then, the LIDAR 123 calculates the distance from the LIDAR 123 to the object around the vehicle 101 based on the reflection time (the time to detect reflected light after emission).

The automatic driving control device 114 is supported by the vehicle body 102. The automatic driving control device 114 controls the vehicle motion device 107 to move the vehicle 101 automatically without operation of a driver. The automatic driving control device 114 includes such as a memory and a CPU (Central Processing Unit) (neither is shown). A memory stores a program for traveling the vehicle 101 automatically. The CPU executes the program stored in the memory. Accordingly, the CPU controls the vehicle motion device 107 to travel the vehicle 101 automatically based on the information obtained by the image-capturing device 120 and the LIDAR 123. In this specification, automatic driving refers, for example, to level 4 and level 5 of automatic driving according to the National Highway Traffic Safety Administration of the U.S. Department of Transportation. However, the automatic driving is not limited to level 4 and level 5 of automatic driving according to the National Highway Traffic Safety Administration of the U.S. Department of Transportation, but may be level 3 or lower of automatic driving.

The person-identifying device 118 identifies a vehicle user or a person around the vehicle 101 captured by the image-capturing device 120. In the present example 1, the person-identifying device 118 identifies the vehicle user captured by the image-capturing device 120. More specifically, the vehicle user makes vehicle use registration before getting in the vehicle 101. In the vehicle use registration, the vehicle user inputs registration information such as a face, a nickname (or a name), and a mail address of the vehicle user by using vehicle use registration terminal, which is not shown. The registration information may include such as an address, telephone number, date of birth, identification, and credit card information. The vehicle use registration terminal transmits registration information to the person-identifying device 118. This enables the person-identifying device 118 to store the registration information of the vehicle user. The person-identifying device 118 identifies the name of the vehicle user who is captured by the image-capturing device 120 by recognizing a face based on the registration information and the image signal outputted from the image-capturing device 120. The person-identifying device 118 also counts the number of people in the vehicle 101 by identifying the name of the vehicle user.

The action-inducing control device 115 is supported by the vehicle body 102. The action-inducing control device 115 induces the information display device 121 to display an image for inducing (instruct) a vehicle user or a person around the vehicle 101 who is captured by the image-capturing device 120 to take a vehicle-user action, and/or induces the audio output device 122 to output audio for inducing a vehicle user or a person around the vehicle 101 who is captured by the vehicle user image-capturing device 120 to take a vehicle-user action. In the present example 1, the action-inducing control device 115 induces the information display device 121 to display an image for inducing the vehicle user captured by the image-capturing device 120 to take a vehicle-user action, and induces the audio output device 122 to output audio for inducing the vehicle user captured by the image-capturing device 120 to take a vehicle-user action. In particular, the action-inducing control device 115 induces the information display device to display an image for inducing the vehicle user identified by the person-identifying device 118 to take a vehicle-user action, and induces the audio output device 122 to output audio for inducing the vehicle user identified by the person-identifying device 118 to take a vehicle-user action. If the vehicle user identified by the person-identifying device 118 is named Jack, the action-inducing control device 115 displayed an image including character information, which is "Jack! If you are ready to go, please give a thumbs-up", on the information display device 121. In addition, the action-inducing control device 115 induces the audio output device 122 to announce that "Jack! If you are ready to go, please give a thumbs-up". The action-inducing control device 115 described above includes such as a memory and a CPU, etc.

The action recognition device 116 recognizes a vehicle-user action of a vehicle user or a person around the vehicle 101 captured by the image-capturing device 120. In the present example 1, the action recognition device 116 recognizes a vehicle-user action of the vehicle user captured by the image-capturing device 120. More specifically, the vehicle user takes an action in accordance with an instruction of a vehicle-user action by the action-inducing control device 115. In other words, the vehicle user gives a thumbs-up. The action recognition device 116 recognizes whether a vehicle user is giving a thumbs-up based on an image signal outputted from the image-capturing device 120. In the present example 1, the action recognition device 116 recognizes whether the vehicle user (Jack) identified by the person-identifying device 118 is giving a thumbs-up based on the image signal outputted from the image-capturing device 120. Such recognition can be realized by, for example, in combination with face authentication, hand authentication and "Open Pose" (Carnegie Mellon University). More specifically, "Open Pose" can identify the position of each part of the body of the vehicle user in the image shown by the image signal. The face authentication can identify the face of the vehicle user in the image of the image signal. The hand authentication can identify that the hand of the vehicle user in the image of the image signal is giving a thumbs-up. Therefore, the action recognition device 116 recognizes whether the position of the face identified by the face authentication and the position of the hand that is giving a thumbs-up identified by the hand authentication are identical with the position of the face and the position of the hand identified by the "Open Pose". When the position of the face identified by the face authentication and the position of the hand, which has given a thumbs-up, identified by the hand authentication are identical with the position of the face and the position of the hand identified by the "Open Pose", the action recognition device 116 recognizes that the vehicle user (Jack), whose face has been identified by the face authentication, is giving a thumbs-up.

The vehicle action-executing device 117 executes the vehicle action based on a vehicle-user action of the vehicle user or the person around the vehicle 101 recognized by the action recognition device 116. In the present example 1, the vehicle action-executing device 117 executes the vehicle action based on a vehicle-user action of the vehicle user recognized by the action recognition device 116. The vehicle action is, for example, the movement of the vehicle 101. In the present example 1, the vehicle action is starting the vehicle 101 in motion. Therefore, the vehicle action-executing device 117 instructs the automatic driving control device 114 to start the vehicle 101 in motion when the action recognition device 116 recognizes the vehicle-user action of the vehicle user (thumbs-up). In this embodiment, when a plurality of vehicle users is in the vehicle 101 and the action recognition device 116 recognizes the vehicle-user action (thumbs-up) of all of a plurality of vehicle users, the action recognition device instructs the automatic driving control device 114 to start the vehicle 101 in motion. Whether the action recognition device 116 has recognized the vehicle-user action (thumbs-up) of all of a plurality of vehicle users is determined by the fact that the vehicle action-executing device 117 recognizes whether the number of vehicle users counted by the person-identifying device 118 is identical with the number of vehicle users recognized by the action recognition device 116 as having taken the vehicle-user action (thumbs-up).

The vehicle 101 configured as described above travels automatically on a predetermined route shown in FIG. 6. However, the route does not necessarily need to be a predetermined route.

Figure 7:
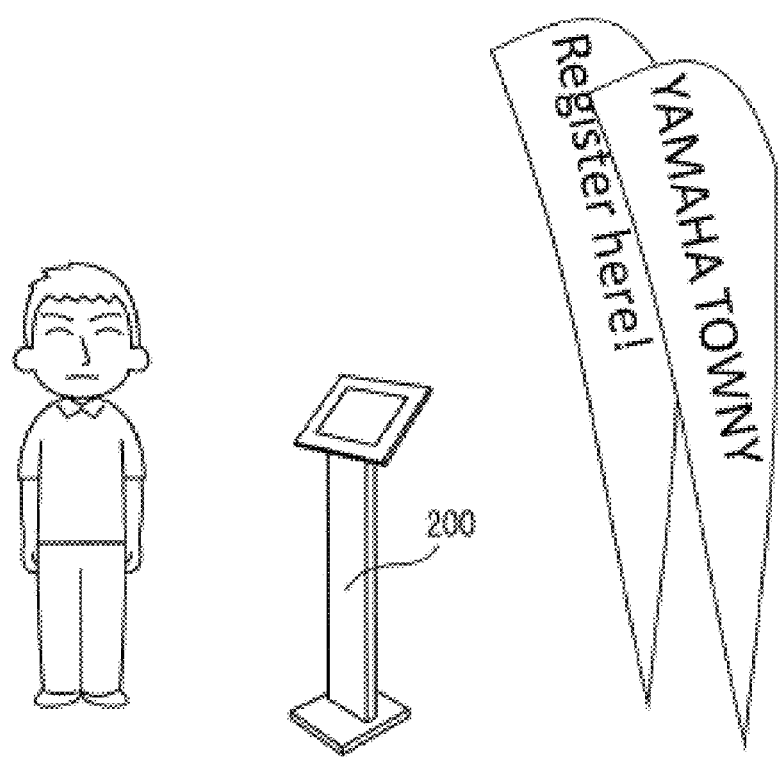
FIG. 7 shows a vehicle user and a vehicle use registration terminal.

(Vehicle use registration) Next, vehicle use registration will be described with reference to the drawings. FIG. 7 shows a vehicle user and a vehicle use registration terminal. FIGS. 8 to 11 show images displayed by the vehicle use registration terminal.

Figure 8:
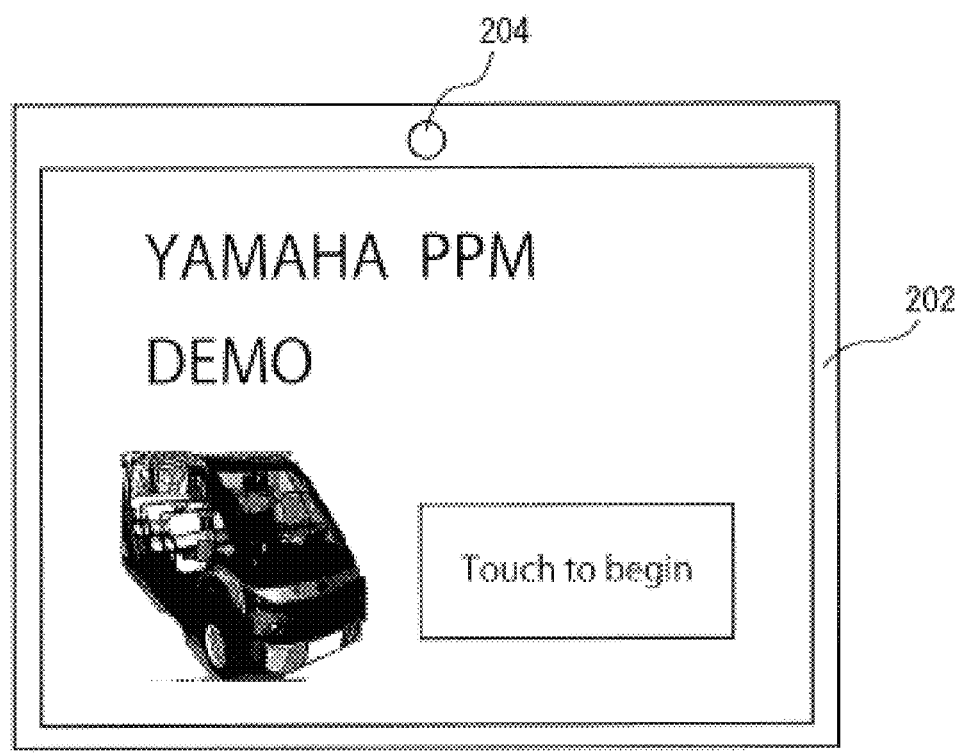
FIG. 8 is an image displayed by the vehicle use registration terminal.

The vehicle user operates the vehicle use registration terminal 200 shown in FIG. 7. As shown in FIG. 8, the vehicle use registration terminal 200 comprises a display unit with a touch panel 202 and a camera 204. As shown in FIG. 8, the display unit with the touch panel 202 displays an image for inducing the vehicle user to touch the display unit with the touch panel 202.

Figure 9:
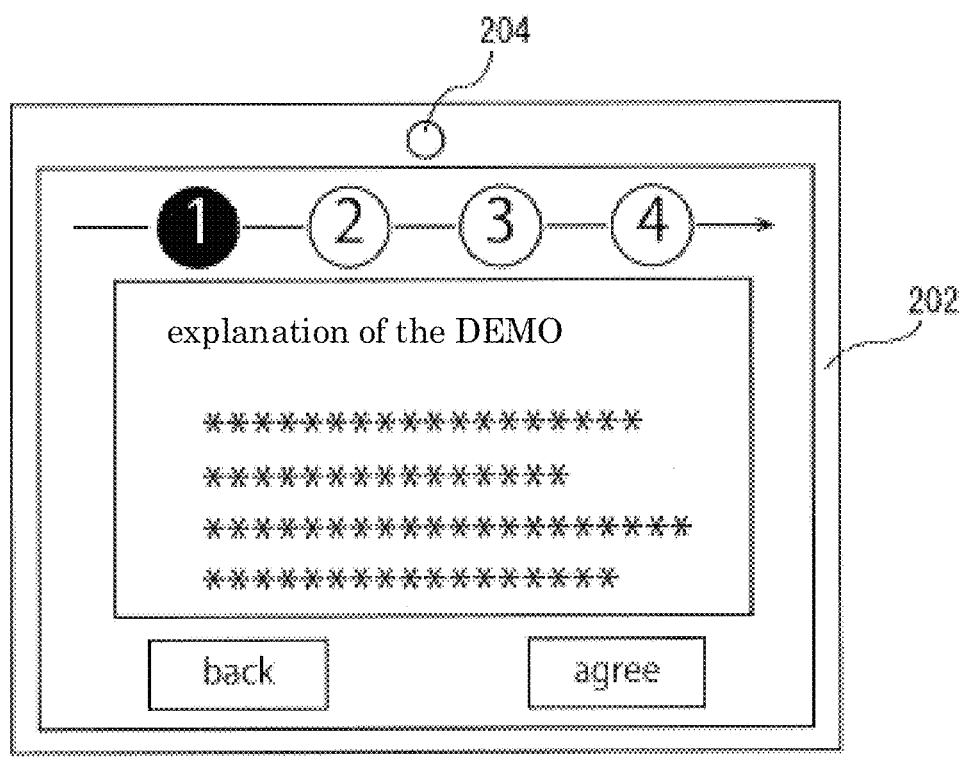
FIG. 9 is an image displayed by the vehicle use registration terminal.

When the vehicle user touches the display unit with the touch panel 202, an image showing a precautionary statement shown in FIG. 9 is displayed on the display unit with the touch panel 202. In the image shown in FIG. 9, a button indicating whether the user agrees with the precautionary statement is displayed. The vehicle user touches a button indicating agreement.

Figure 10:
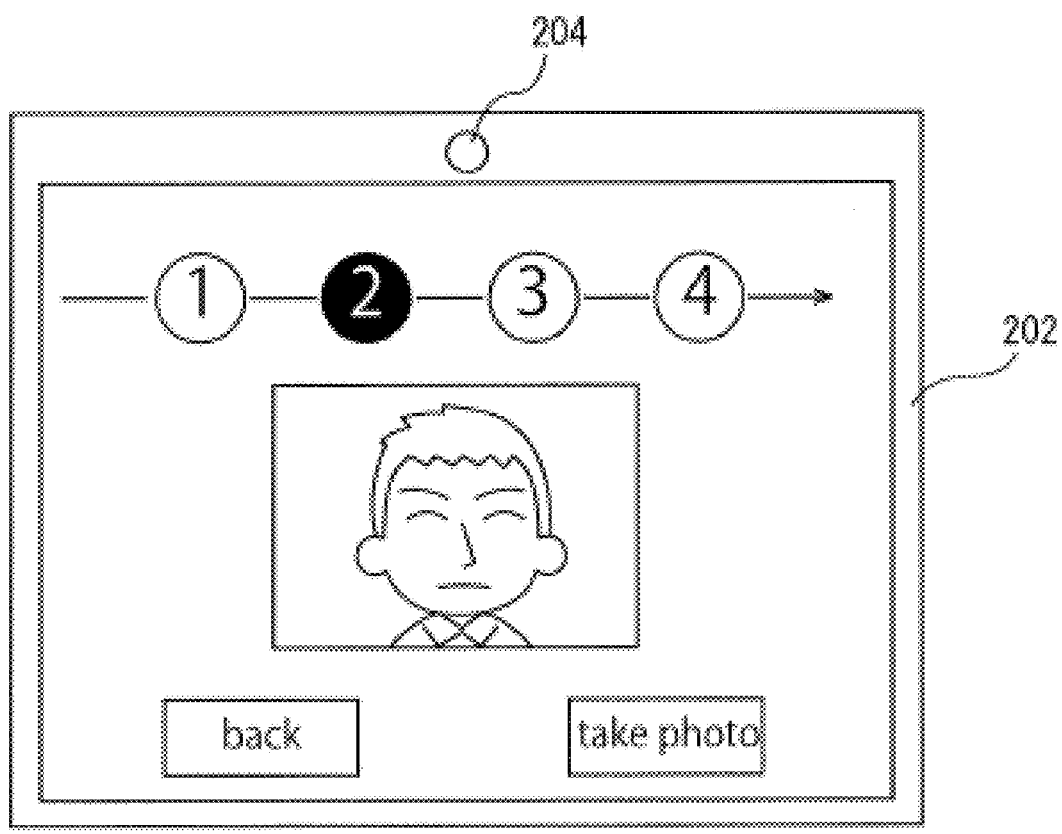
FIG. 10 is an image displayed by the vehicle use registration terminal.

If the vehicle user touches a button indicating agreement, the camera 204 captures the face of the vehicle user. Then, as shown in FIG. 10, the face image of the vehicle user captured by the camera 204 is displayed on the display unit with a touch panel 202.

Figure 11:
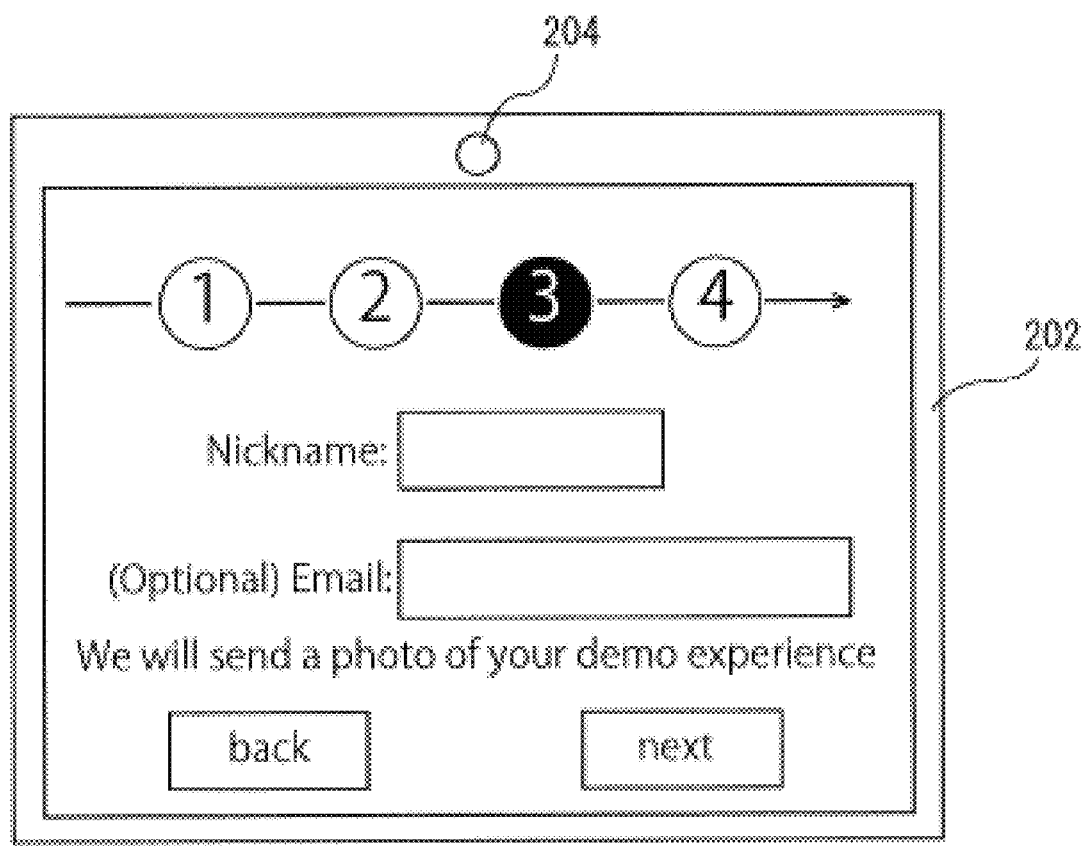
FIG. 11 is an image displayed by the vehicle use registration terminal.

Next, as shown in FIG. 11, the vehicle use registration terminal 200 induces the display unit with the touch panel 202 to display an image for inducing a vehicle user to input registration information that includes a nickname and a mail address. The vehicle user operates the display unit with the touch panel 202 to input registration information. When the input of the registration information is completed, the vehicle use registration terminal 200 transmits the registration information of the vehicle user to the person-identifying device 118 via the Internet line. The person-identifying device 118 stores registration information of a vehicle user.

(Motion of starting in motion) Next, the motion of starting the vehicle 101 in motion will be described. The motion of starting in motion is one that the vehicle 101 starts in motion from a stopped state. FIGS. 12 to 17 show images displayed by the information display device 121 at the time of starting in motion. The information display device 121 displays an image signal outputted from the image-capturing device 120. Furthermore, as shown in FIGS. 12 to 17, the information display device 121 displays character information on the lower part of the image. In addition, as shown in FIGS. 12 to 17, the information display device 121 displays the number of vehicle users and the number of users who are giving a thumb-up on the right part of the image.

Figure 12:
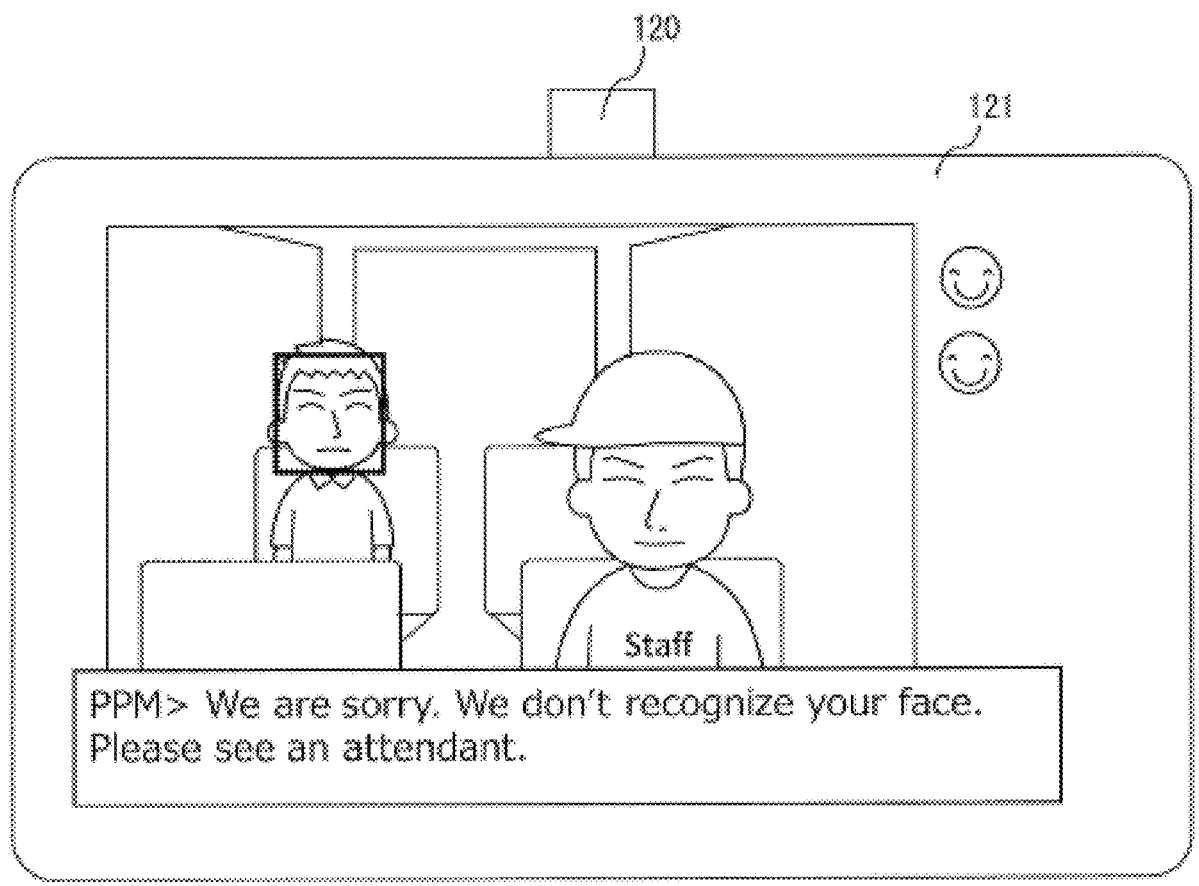
FIG. 12 is an image displayed by an information display device 121 when starting in motion.

In the vehicle 101, a staff member of the operation system of the vehicle 101 is always in the vehicle as a first vehicle user. However, the staff does not necessarily need to be in the vehicle 101. As shown in FIG. 12, when a second vehicle user gets in, the person-identifying device 118 identifies the second vehicle user. First, a case where the second vehicle user does not make the vehicle use registration will be described. In this case, the person-identifying device 118 recognizes whether the second vehicle user has made the vehicle use registration based on the image signal and the registration information. Then, as shown in FIG. 12, the action-inducing control device 115 induces the information display device 121 to display character information indicating that the face of the second vehicle user cannot be recognized. Furthermore, the action-inducing control device 115 induces the audio output device 122 to output audio indicating that the face of the second vehicle user cannot be recognized. In this case, the vehicle 101 cannot start in motion. In the image of FIG. 12, the information display device 121 displays that two of vehicle users are in the vehicle.

Figure 13:
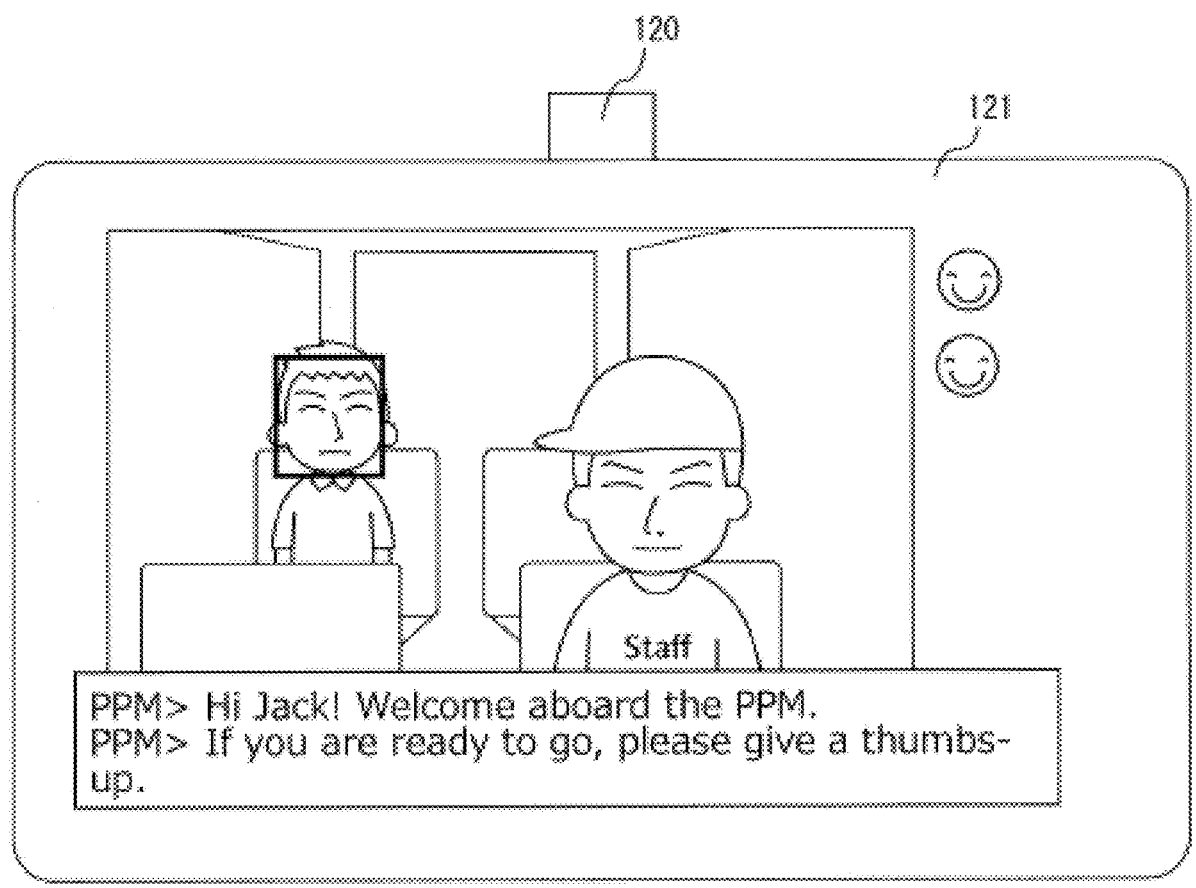
FIG. 13 is an image displayed by an information display device 121 when starting in motion.

Next, a case where the second vehicle user makes the vehicle use registration will be described. In this case, the person-identifying device 118 recognizes whether the second vehicle user has made the vehicle use registration based on the image signal and the registration information. The person-identifying device 118 identifies the second vehicle user based on the image signal and the registration information. In this embodiment, the person-identifying device 118 identifies the second vehicle user with Jack. Therefore, as shown in FIG. 13, the action-inducing control device 115 induces the information display device 121 to display character information for inducing the second vehicle user to give a thumbs-up. Furthermore, the action-inducing control device 115 induces the audio output device 122 to output audio for inducing the second vehicle user to give a thumbs-up. In the image of FIG. 13, the information display device 121 displays that two of vehicle users are in the vehicle.

Figure 14:
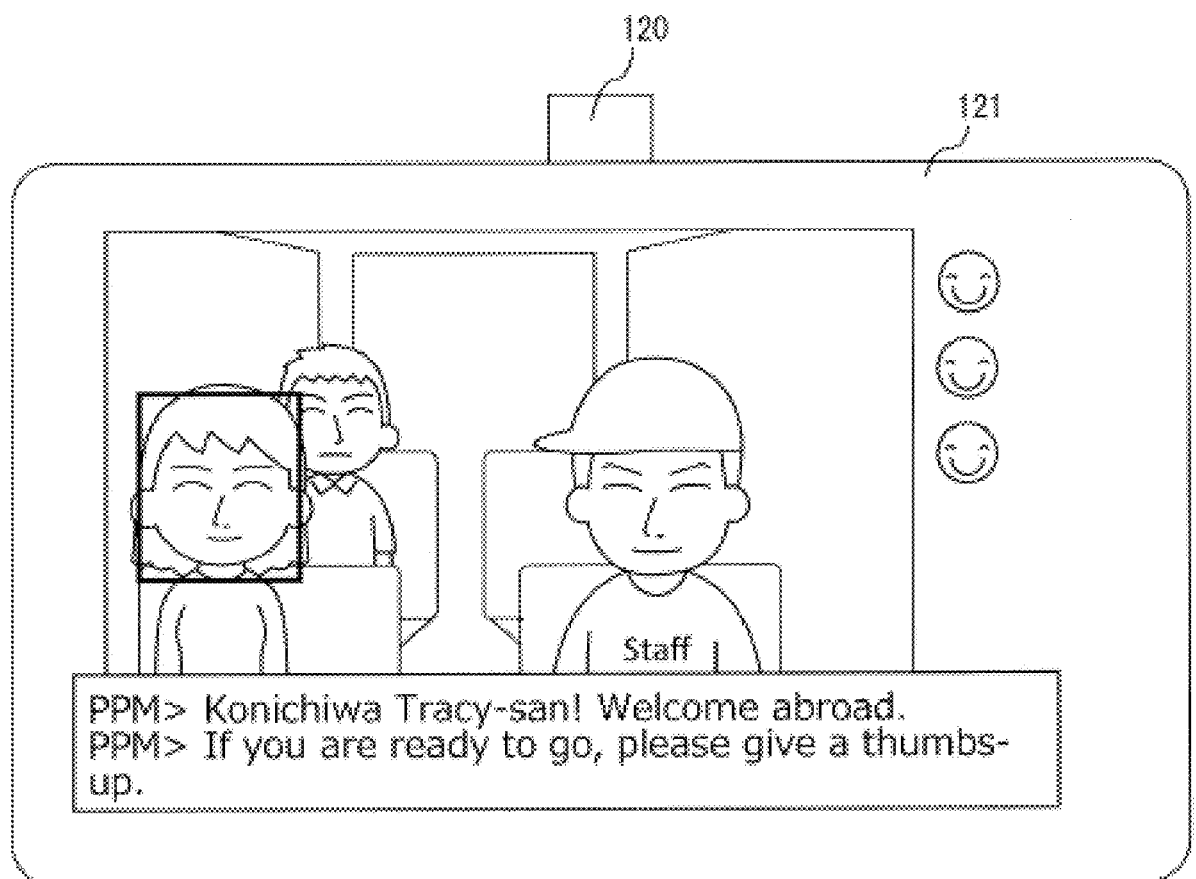
FIG. 14 is an image displayed by an information display device 121 when starting in motion.

Next, following the second vehicle user, the third vehicle user gets in the vehicle 101. The third vehicle user has made vehicle use registration. The person-identifying device 118 recognizes whether the third vehicle user vehicle has made use registration based on the image signal and the registration information. The person-identifying device 118 identifies the third vehicle user based on the image signal and the registration information. In the present example 1, the person-identifying device 118 identifies the third vehicle user with Tracey. Therefore, as shown in FIG. 14, the action-inducing control device 115 induces the information display device 121 to display character information for inducing the third vehicle user to give a thumbs-up. Furthermore, the action-inducing control device 115 induces the audio output device 122 to output audio for inducing the third vehicle user to give a thumbs-up. In the image of FIG. 14, the information display device 121 displays that three of vehicle users are in the vehicle. In addition, as shown in FIG. 13, Jack is called in English. On the other hand, as shown in FIG. 14, Tracy is called in Japanese. The language in calling may be changed according to the registered information.

Figure 15:
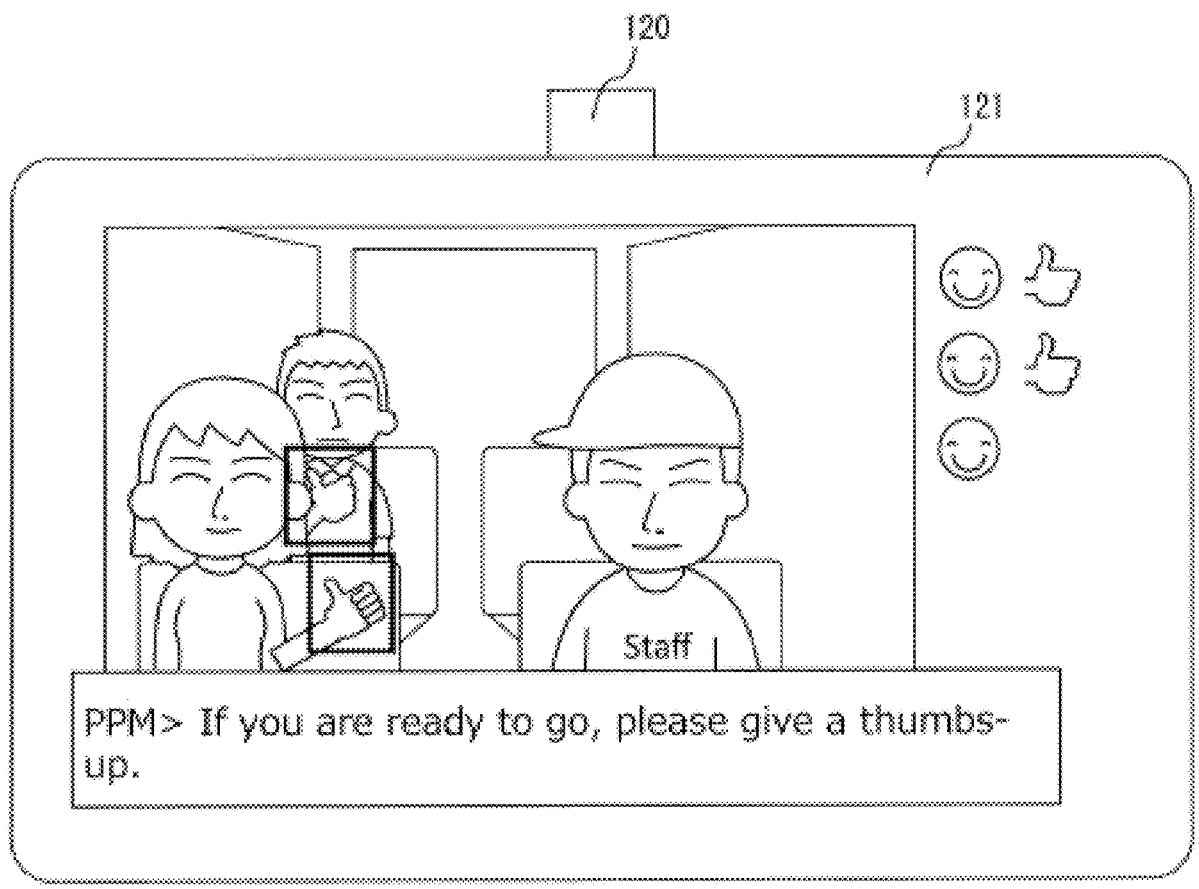
FIG. 15 is an image displayed by an information display device 121 when starting in motion.
Figure 16:
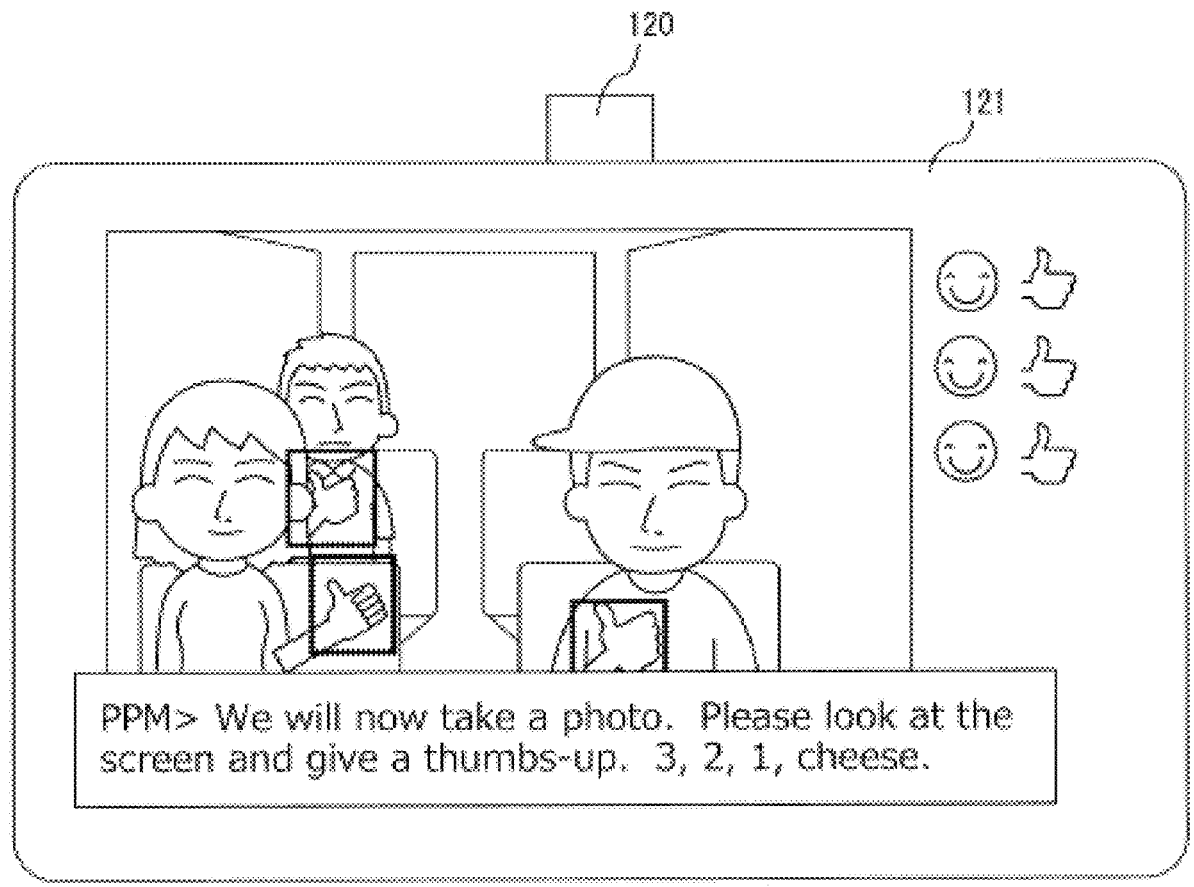
FIG. 16 is an image displayed by an information display device 121 when starting in motion.

The second vehicle user and the third vehicle user give a thumbs-up as shown in FIG. 15. Next, as shown in FIG. 16, the first vehicle user (staff) also gives a thumbs-up. The action recognition device 116 recognizes the thumbs-up of the first vehicle user, the second vehicle user and the third vehicle user. In the image of FIG. 15, the information display device 121 displays that three of vehicle users are in the vehicle. In addition, in the image of FIG. 15, the information display device 121 displays that two of vehicle users give a thumbs-up. In the image of FIG. 16, the information display device 121 displays that three of vehicle users are in the vehicle. In the image of FIG. 16, the information display device 121 displays that three of vehicle users give a thumbs-up.

In the image of FIG. 16, the number of vehicle users counted by the person-identifying device 118 is identical with the number of vehicle users recognized by the action recognizing device 116 as having given the thumbs-up. Therefore, as shown in FIG. 16, the action-inducing control device 115 induces the information display device 121 to display character information for inducing to look at the information display device 121 in order to take a photograph. Further, the action-inducing control device 115 induces the audio output device 122 to output audio for inducing to look at the information display device 121 in order to take a photograph. Accordingly, the first vehicle user, the second vehicle user, and the third vehicle user look at the information display device 121. After that, the vehicle action-executing device 117 instructs the image-capturing device 120 to take a photograph.

Figure 17:
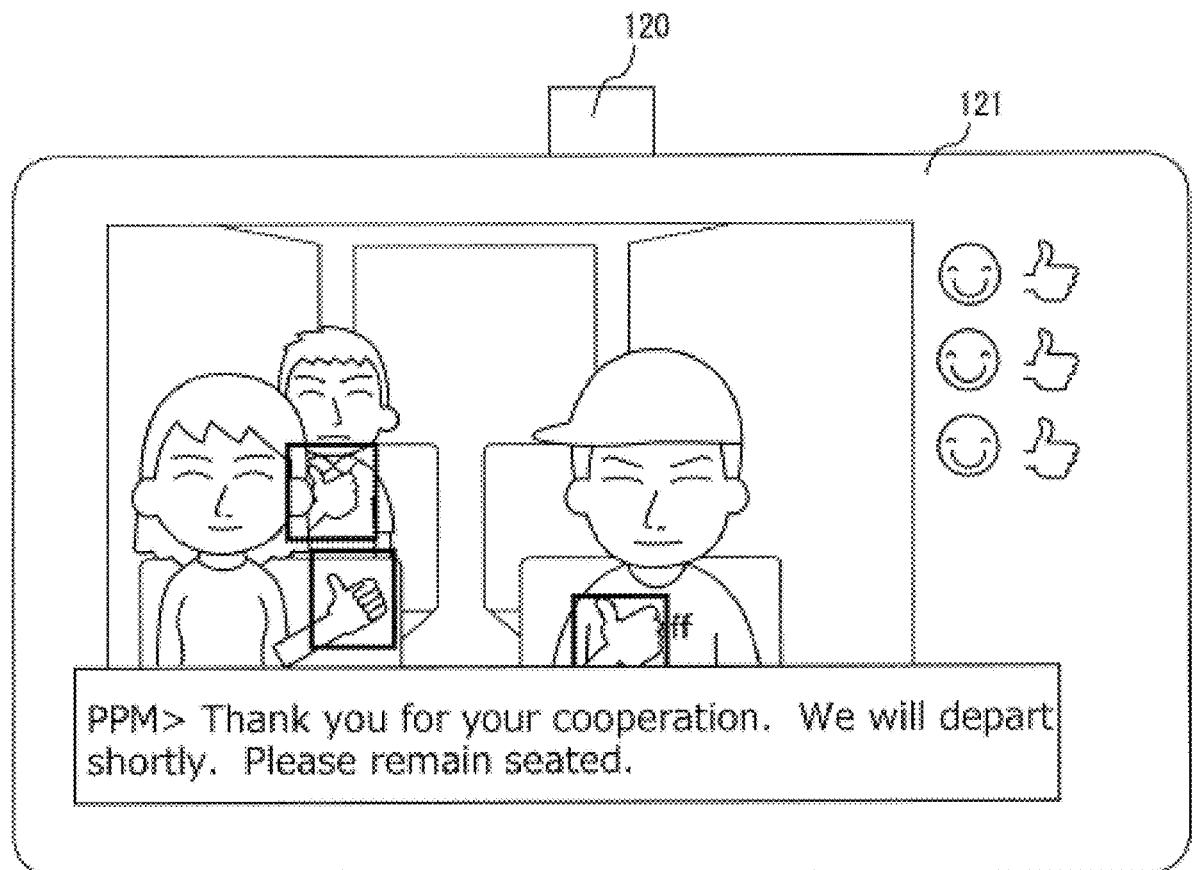
FIG. 17 is an image displayed by an information display device 121 when starting in motion.

Finally, as shown in FIG. 17, the vehicle action-executing device 117 induces the information display device 121 to display character information indicating the start of the vehicle 101 in motion. After this, the vehicle action-executing device 117 induces the automatic driving control device 114 to start the vehicle 101 in motion.

(Motion of Getting Off)

Figure 18:
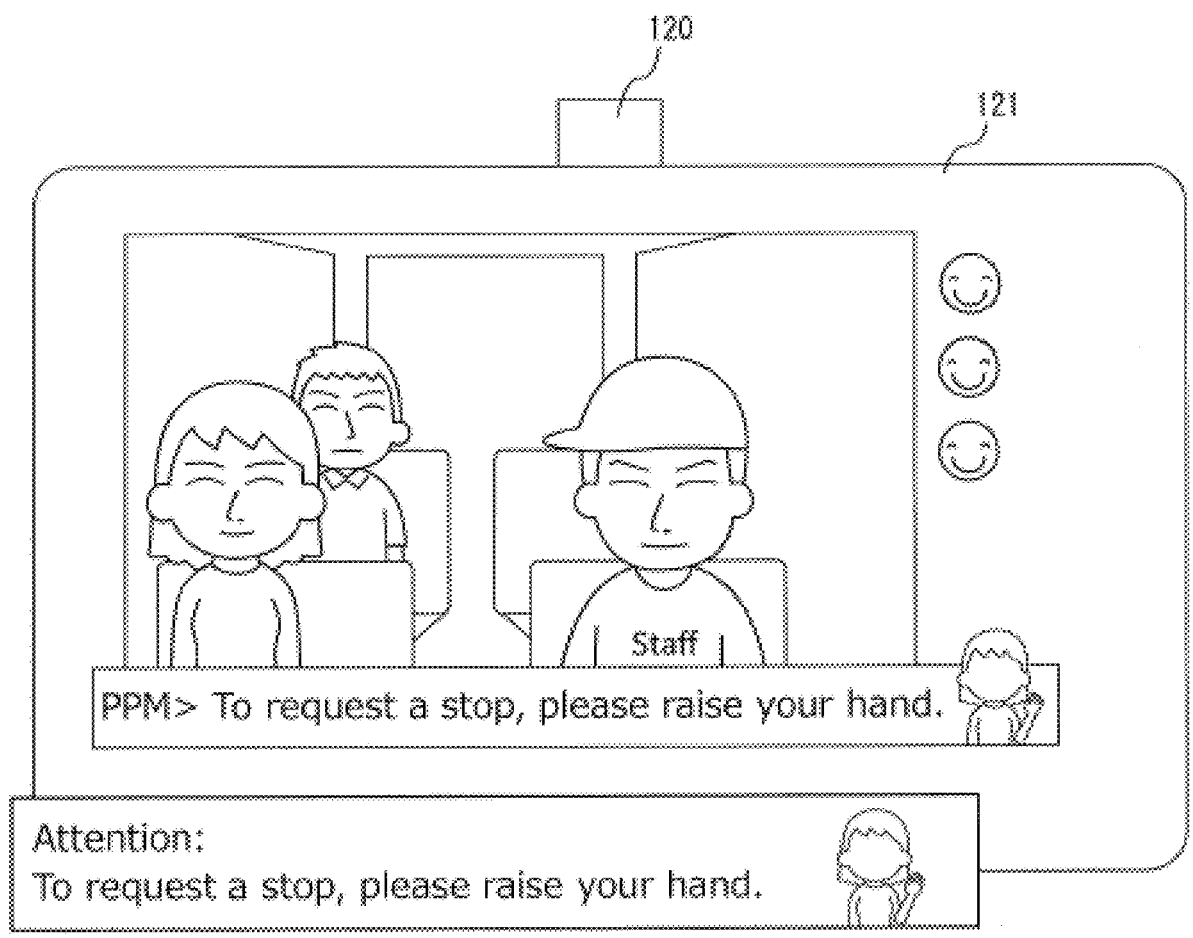
FIG. 18 is an image displayed by an information display device 121 when getting off the vehicle.
Figure 19:
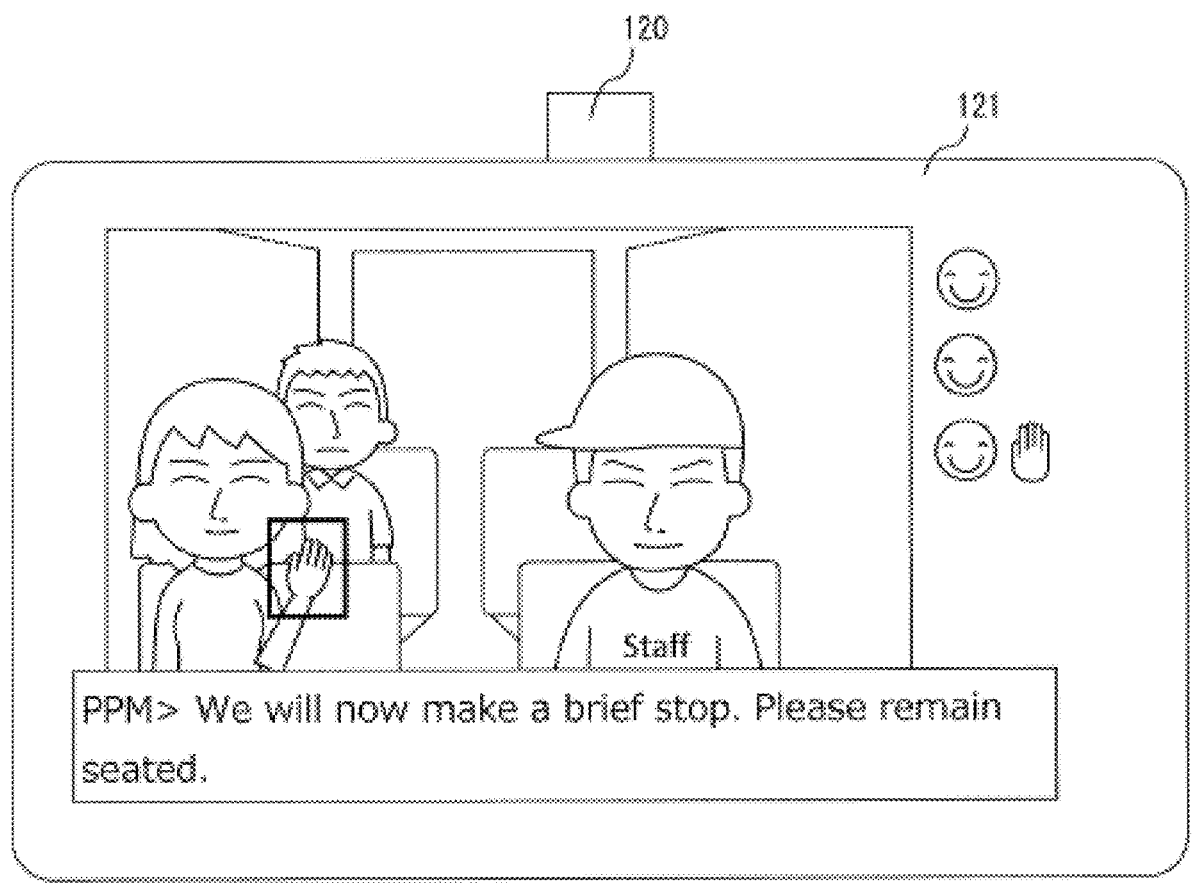
FIG. 19 is an image displayed by an information display device 121 when getting off the vehicle.
Figure 20:
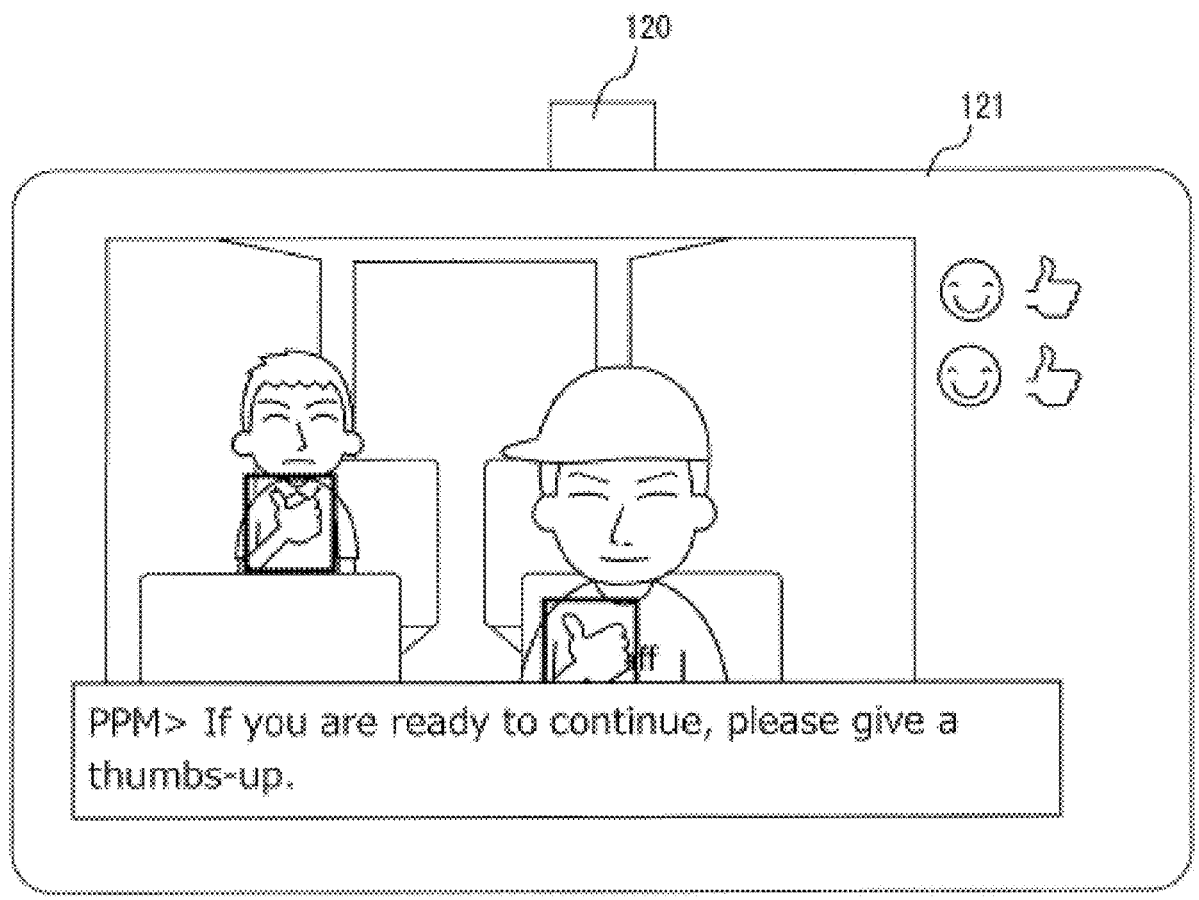
FIG. 20 is an image displayed by an e information display device 121 when getting off the vehicle.

Next, the motion of getting off will be described. The motion of getting off is a motion for the vehicle user to get off the vehicle 101. FIGS. 18 to 20 show images displayed by the information display device 121 when getting off.

While the vehicle 101 is traveling, as shown in FIG. 18, the action-inducing control device 115 induces the information display device 121 to display an image for inducing to raise a hand for making a stopover. Accordingly, the third vehicle user raises a hand in order to make a stopover while the vehicle 101 is traveling. The action recognition device 116 recognizes that the third vehicle user raises the hand. As shown in FIG. 19, the action-inducing control device 115 induces the information display device 121 to display character information indicating that the vehicle will temporarily stop in order for the third vehicle user to make a stopover. Furthermore, the action-inducing control device 115 induces the audio output device 122 to output audio indicating that the vehicle will stop in order for the third vehicle user to make a stopover. After this, the vehicle action-executing device 117 induces the automatic driving control device 114 to temporarily stop the vehicle 101. Thus, the third vehicle user can make a stopover. After this, as shown in FIG. 20, when the first vehicle user and the second vehicle user give a thumbs-up, the vehicle 101 restarts in motion.

(Motion of Detecting an Obstacle)

Figure 21:
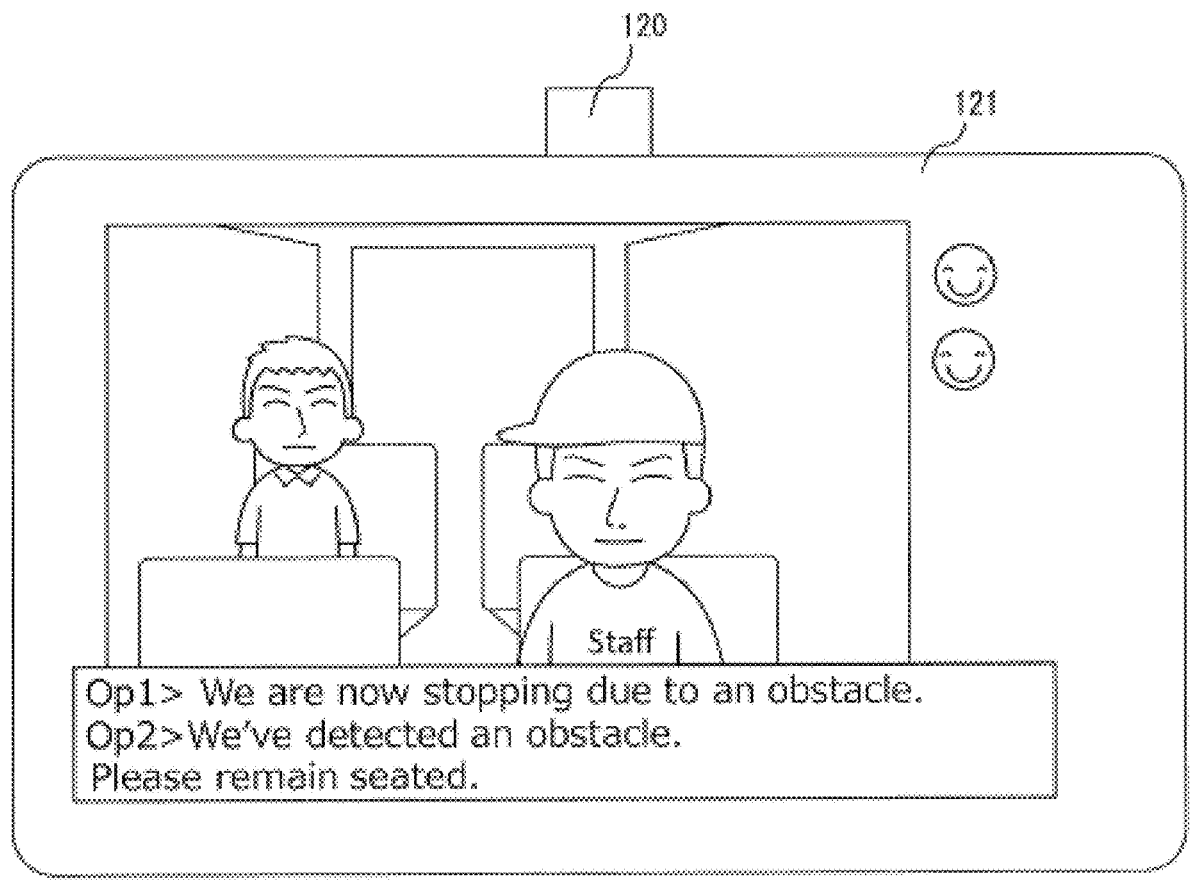
FIG. 21 shows an image displayed by an information display device 121 when detecting an obstacle.
Figure 22:
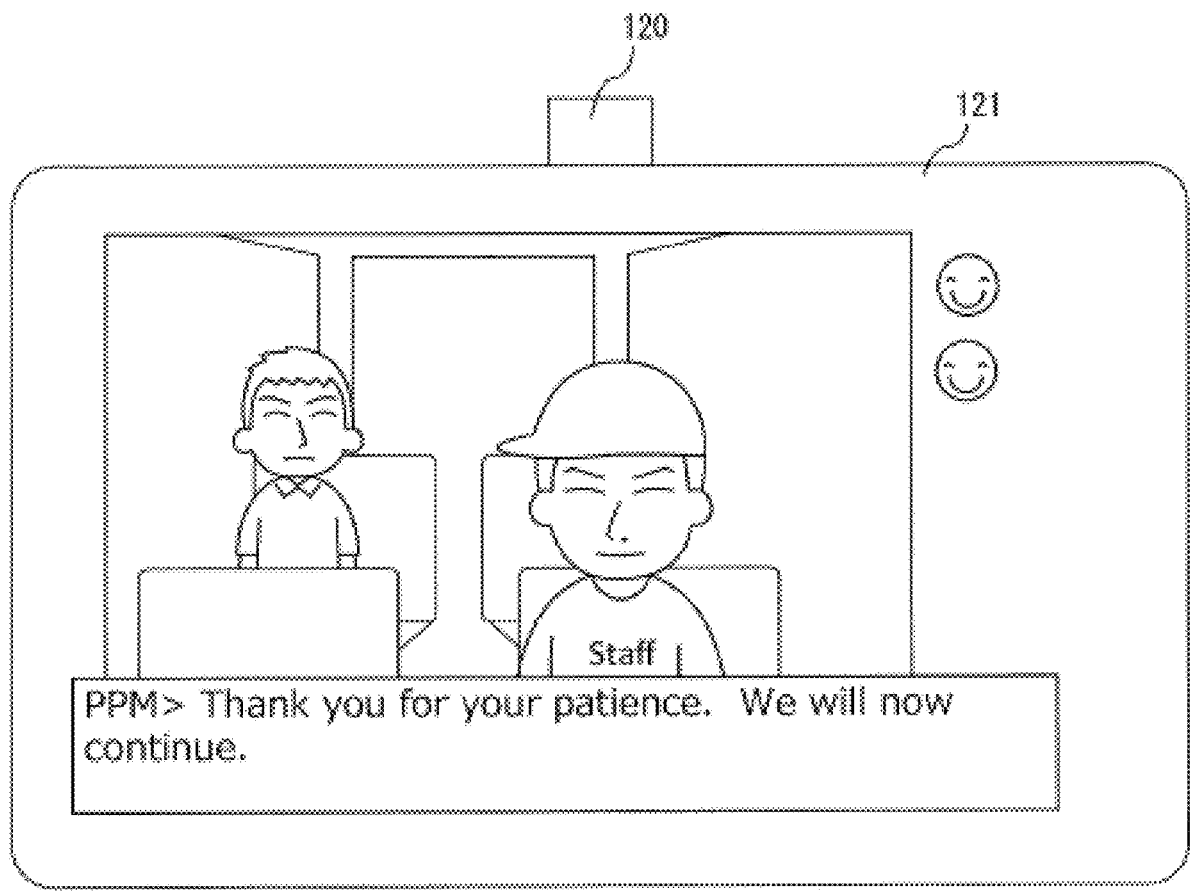
FIG. 22 shows an image displayed by an information display device 121 when detecting an obstacle.

Next, the motion of detecting an obstacle will be described. The motion of detecting an obstacle is a motion in which the vehicle 101 stops by detecting an obstacle (a person and/or an object) that obstructs the movement of the vehicle 101. FIGS. 21 and 22 show images displayed by the information display device 121 in the motion of detecting an obstacle.

When the automatic driving control device detects an obstacle on the way of the vehicle 101, the automatic driving control device 114 induces the information display device 121 to display character information indicating that the vehicle 101 will stop, as shown in FIG. 21. Further, the automatic driving control device 114 induces the audio output device 122 to output audio indicating that the vehicle 101 will stop. The automatic driving control device 114 temporarily stops the vehicle 101. If the image-capturing device 120 captures that the obstacle is a person, the audio output device 122 may output audio for inducing the person around the vehicle 101 to give way. As shown in FIG. 22, the automatic driving control device 114 induces the information display device 121 to display character information indicating the restart of the automatic driving when an obstacle has been avoided or when an obstacle has left from the way. Moreover, the automatic driving control device 114 induces the audio output device 122 to output audio indicating the restart of the automatic driving. The automatic driving control device 114 restarts the vehicle 101 in motion.

Figure 23:
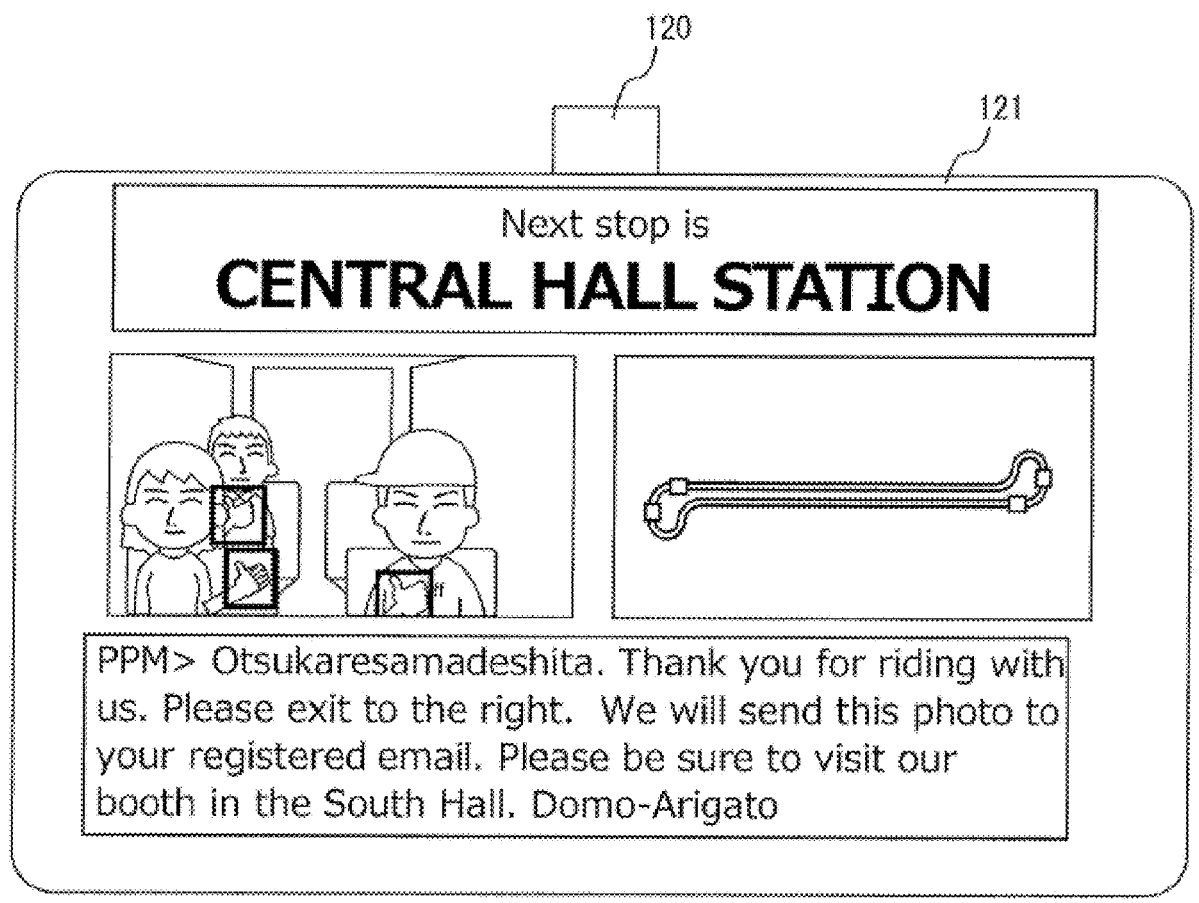
FIG. 23 shows an image displayed by an information display device 121 when arriving at a stop.

(Motion of arriving at a stop) Next, the motion of arriving at a stop will be described. The motion of arriving at a stop is a motion that is taken when the vehicle 101 arrives at a stop. FIG. 23 shows an image displayed by the information display device 121 when arriving at a stop.

As shown in FIG. 23, the automatic driving control device 114 induces the information display device 121 to display character information indicating that the vehicle will be soon arriving at a stop immediately before arriving at the stop. The image shown in FIG. 23 includes the route shown in FIG. 6. Moreover, FIG. 23 shows the current position of the vehicle 101 in the route. In addition, as shown in FIG. 23, the automatic driving control device 114 induces the information display device 121 to display character information indicating that the image signal of the image shown in FIG. 16, that is, the image captured before leaving is transmitted to the mail address in the registration information. The automatic driving control device 114 induces the audio output device 122 to output audio signal indicating that the image signal of the image shown in FIG. 16, that is, the image captured before leaving is transmitted to the mail address in the registration information.

Effects

The vehicle 101 can coexist with and cooperate with people. The reasons are as follows.

In order to realize coexistence and cooperation with people in an autonomous vehicle, it is important to establish a relationship between autonomous vehicles and people. In the vehicle 101, the information display device 121 displays an image and the audio output device 122 outputs audio so as to induce a user of the vehicle 101 or a person around the vehicle 101 who is captured by the image-capturing device 120 to take an action. Accordingly, it is possible to change a state or an action of a user of the vehicle 101 or a person around the vehicle 101 who is captured by the image-capturing device 120. As a result, relationships between the vehicle 101 and people can be established. Consequently, the vehicle 101 can coexist and cooperate with people.

In the vehicle 101, a hardware structure and/or a software structure can be of low complication. The reasons are as follows.

In the vehicle 101, the action-inducing control device 115 induces the information display device 121 to display an image for inducing the vehicle user or the person around the vehicle 101 captured by the image-capturing device 120 to take an action of the vehicle user, and/or induces the audio output device 122 to output audio for inducing the vehicle user or the person around the vehicle 101 captured by the image-capturing device 120 to take an action of the vehicle user. Accordingly, the vehicle user or the person around the vehicle 101 takes an action of the vehicle user according to an image or an audio. Consequently, the vehicle 101 may have a hardware structure and/or a software structure capable of recognizing an action of the vehicle user in accordance with an image or an audio. In other words, it is not necessary for the vehicle 101 to have a hardware and/or a software structures capable of recognizing a wide variety of actions of the vehicle user. As a result, in the vehicle 101, the hardware structure and/or the software structure can be of low complication.

According to the vehicle 101, a vehicle user or a person around the vehicle sees the image-capturing device 120 when the vehicle user or the person around the vehicle 101 looks at the information display device 121. This results in less overlap between faces of a plurality of vehicle users or people around the vehicle 101 when the image-capturing device 120 captures a plurality of vehicle users or people around the vehicle 101. Thus, the image-capturing device 120 can easily capture a face of a vehicle user or a person around the vehicle 101. As a result, the person-identifying device 118 can easily identify a vehicle user or a person around the vehicle 101. In addition, the vehicle 101 can transmit more information to a vehicle user or a person around the vehicle 101 because the vehicle user or the person around the vehicle 101 looks at the information display device 121.

According to the vehicle 101, the audio output device 122 outputs audio such that a vehicle user or a person around the vehicle 101 feels that audio is outputted from a place where the image-capturing device 120 and the information display device 121 are arranged. Thus, a vehicle user or a person around the vehicle 101 sees the image-capturing device 120 when audio is outputted. This results in less overlap between faces of a plurality of vehicle users or people around a plurality of vehicles 101 when the image-capturing device 120 captures a plurality of vehicle users or people around the vehicle 101. Thus, the image-capturing device 120 can easily capture the face of the vehicle user or the person around the vehicle 101. As a result, the person-identifying device 118 can easily identify a vehicle user or a person around the vehicle 101. In addition, the vehicle 101 can transmit more information to a vehicle user or a person around the vehicle 101 because the vehicle user or the person around the vehicle 101 looks at the information display device 121.

Example 2 of the Embodiment

Next, a vehicle according to example 2 of one embodiment of the present teaching will be described. FIG. 24 is a side view of the vehicle 101a, 101b, and 101c. In FIG. 24, the vehicle 101a, 101b, and 101c are schematically illustrated, and functional blocks are also described.

The vehicle 101a is used for transporting baggage. Consequently, the vehicle 101a can load baggage. Therefore, a loading platform 212 is provided instead of a plurality of seats 112. The loading platform 212 has a plane orthogonal to a straight line extending in the up-down direction UD. Baggage are loaded on the loading platform 212. In other words, the loading platform 212 is an example of the deck.

First, a sender requests to receive baggage through using, for example, a portable terminal (for example, a smartphone). The vehicle 101a moves automatically to the sender for receiving baggage. The sender loads baggage onto the loading platform 212. After this, the vehicle 101a moves automatically to a recipient.

When the vehicle 101a arrives at a recipient, the image-capturing device 120 captures the recipient. In other words, the recipient is a vehicle user of the vehicle 101a. The vehicle user often stands on a region in the right direction of the vehicle 101a. Accordingly, the image-capturing device 120 is arranged to capture the region in the right direction of the vehicle 101a. Therefore, the image-capturing device 120 is arranged so that the optical axis of the image-capturing device 120 extends in the right direction R. If the vehicle user often stands on a region in the left direction of the vehicle 101a, the image-capturing device 120 may be arranged such that the optical axis of the image-capturing device 120 extends in the left direction L. The person-identifying device 118 stores by associating baggage to be received by the recipient with the recipient when the sender requests to receive baggage.

The person-identifying device 118 identifies the recipient based on an image signal outputted from the image-capturing device 120. In other words, the person-identifying device 118 recognizes whether the person shown in the image signal outputted from the image-capturing device 120 is the recipient. If the person shown in the image signal outputted from the image-capturing device 120 is not the recipient, the person-identifying device 118 induces the information display device 121 to display character information indicating that the person shown in the image signal is not the recipient. Furthermore, the person-identifying device 118 induces the audio output device 122 to output audio indicating that the person shown in the image signal is not the recipient.

On the other hand, if the person shown in the image signal outputted from the image-capturing device 120 is the recipient, the person-identifying device 118 induces the information display device 121 to display character information for inducing the recipient to pick up baggage (for example, "Please pick up the second baggage from the right."). Further, the person-identifying device 118 induces the audio output device 122 to output audio for inducing the recipient to pick up baggage (for example, "Please pick up the second baggage from the right."). In other words, picking up the baggage is an action by a vehicle user. Accordingly, the recipient picks up the baggage.

The action recognition device 116 recognizes whether the recipient has held baggage that is to be picked up by the recipient based on the image signal outputted from the image-capturing device 120. The action recognition device 116 induces the information display device 121 to display character information indicating gratitude (for example, "Thank you very much.") when the recipient has held baggage to be picked up by the recipient. Further, the person-identifying device 118 induces the audio output device 122 to output audio indicating gratitude (for example, "Thank you very much."). After this, the vehicle action-executing device 117 makes the automatic driving control device 114 start the vehicle 101 based on the action of picking up baggage by the recipient.

On the other hand, if the recipient holds baggage different from that which is to be picked up by the recipient, the action recognition device 116 induces the information display device 121 to display character information indicating that the recipient is holding wrong baggage (for example, "You've picked up the wrong baggage."). Further, the action recognition device 116 induces the audio output device 122 to output audio indicating that the user is holding wrong baggage (for example, "You've picked up the wrong baggage.").

As is clear from these descriptions, in the present example 2, the image-capturing device 120 captures the loading platform 212 in order to determine whether the action has been taken in accordance with the character information displayed on the information display device 121 and the audio outputted from the audio output device 122. In the present example 2, the information display device 121 displays the character information and the audio output device 122 outputs the audio so as to further induce the action after determining whether the action has been taken in accordance with the character information displayed on the information display device 121 and the audio outputted from the audio output device 122.

The vehicle 101a as described above can also coexist and cooperate with people, and can have a hardware structure and/or a software structure of low complication for the same reason as the vehicle 101. Further, according to the vehicle 101a, the person-identifying device 118 can easily identify the vehicle user for the same reason as the vehicle 101. In addition, according to the vehicle 101a, the vehicle can transmit more information to the vehicle user because the vehicle user looks at the information display device 121 for the same reason as the vehicle 101.

Example 3 of the Embodiment

Next, a vehicle according to example 3 of the embodiment of the present teaching will be described. FIG. 24 is incorporated herein for the reason that the structure of the vehicle 101b is the same as that of the vehicle 101a.

The vehicle 101b is a mobile store. Accordingly, the vehicle 101b can load goods (baggage). Therefore, a loading platform 212 is provided instead of a plurality of seats 112. The loading platform 212 has a plane orthogonal to a straight line extending in the up-down direction UD. Goods are loaded on the loading platform 212. In other words, the loading platform 212 is an example of the deck.

The vehicle 101b moves automatically to where a purchaser is. The person-identifying device 118 stores registration information in advance such as the face of the purchaser, where the purchaser is, and the credit card information of the purchaser, and the like. When the vehicle 101a arrives at the purchaser, the image-capturing device 120 captures the purchaser. In other words, the purchaser is a vehicle user of the vehicle 101b.

The person-identifying device 118 identifies the purchaser based on the image signal and the registration information outputted from the image-capturing device 120. In other words, the person-identifying device 118 recognizes whether the person shown in the image signal outputted from the image-capturing device 120 is the purchaser. If the person shown in the image signal outputted from the image-capturing device 120 is not the purchaser, the person-identifying device 118 induces the information display device 121 to display character information indicating that the person shown in the image signal is not the purchaser. Further, the person-identifying device 118 induces the audio output device 122 to output audio indicating that the person shown in the image signal is not the purchaser.

On the other hand, if the person shown in the image signal outputted from the image-capturing device 120 is the purchaser, the person-identifying device 118 induces the information display device 121 to display a greeting message and character information for inducing the purchase of goods (for example, 'Welcome, Jack. How about mandarin oranges?'). In addition, the person-identifying device 118 induces the audio output device 122 to output a greeting message and audio for inducing the purchase of goods (for example, 'Welcome, Jack. How about mandarin oranges?'). In other words, purchasing goods is the action of the vehicle user. Accordingly, a purchaser holds goods.

The action recognition device 116 recognizes whether the user has held goods based on the image signal outputted from the image-capturing device 120. The action recognition device 116 induces the information display device 121 to display character information indicating gratitude when the purchaser has held goods (for example, "Thank you for your purchase."). Further, the person-identifying device 118 induces the audio output device 122 to output audio indicating gratitude (for example, "Thank you for your purchase."). After this, the vehicle action-executing device 117 settles the payment for goods of the purchaser based on the credit card information. Further, the vehicle action-executing device 117 makes the automatic driving control device 114 start the vehicle 101a based on the action of picking up goods by the recipient.

As is clear from these descriptions, in the present example 3, the image-capturing device 120 captures the loading platform 212 in order to determine whether the action has been taken in accordance with the character information displayed on the information display device 121 and the audio outputted from the audio output device 122.

The vehicle 101b as described above can also coexist and cooperate with people, and can have a hardware structure and/or a software structure of low complication for the same reason as the vehicle 101. Further, according to the vehicle 101b, the person-identifying device 118 can easily identify the vehicle user for the same reason as the vehicle 101. In addition, according to the vehicle 101b, the vehicle can transmit more information to the vehicle user because the vehicle user looks at the information display device 121 for the same reason as the vehicle 101.

Example 4 of the Embodiment

Next, a vehicle according to the example 4 of the embodiment of the present teaching will be described. FIG. 24 is incorporated herein for the reason that the structure of the vehicle 101c is the same as that of the vehicle 101a.

The vehicle 101c is a mobile store for selling agricultural products produced by farmers. Accordingly, the vehicle 101c can load agricultural products (baggage). Therefore, the loading platform 212 is provided instead of a plurality of seats 112. The loading platform 212 has a plane orthogonal to a straight line extending in the up-down direction UD. Agricultural products are loaded on the loading platform 212. In other words, the loading platform 212 is an example of the deck.

The vehicle 101c moves automatically to where a farmer is. The person-identifying device 118 stores registration information in advance such as the face of the farmer and where the farmer is, and the like. When the vehicle 101a arrives at the farmer, the image-capturing device 120 captures the farmer. In other words, the farmer is a vehicle user of the vehicle 101b.

The person-identifying device 118 identifies the farmer based on the image signal outputted from the image-capturing device 120. In other words, the person-identifying device 118 recognizes whether the person shown in the image signal outputted from the image-capturing device 120 is the farmer. If the person shown in the image signal outputted from the image-capturing device 120 is not the farmer, the person-identifying device 118 induces the information display device 121 to display character information indicating that the person shown in the image signal is not the farmer. Further, the person-identifying device 118 induces the audio output device 122 to output audio indicating that the person shown by the image signal is not the farmer.

On the other hand, if the person shown in the image signal outputted from the image-capturing device 120 is the farmer, the person-identifying device 118 induces the information display device 121 to display a greeting message and character information for inducing to load agricultural products (for example, "Good morning. I have come to collect today's mandarin oranges."). In addition, the person-identifying device 118 induces the audio output device 122 to output a greeting message and character information for inducing to load agricultural products (for example, "Good morning. I have come to collect today's mandarin oranges."). In other words, loading of agricultural products is the action of the vehicle user. Accordingly, a farmer loads agricultural products on the loading platform 212.

The action recognition device 116 recognizes whether the farmer has loaded agricultural products on the loading platform 212 based on the image signal outputted from the image-capturing device 120. When the farmer loads agricultural products on the loading platform 212, the action recognition device 116 induces information display device 121 to display character information indicating gratitude and starting in motion (for example, "Thank you very much. We will depart."). In addition, the action recognition device 116 induces the audio output device 122 to output audio indicating gratitude and starting in motion (for example, "Thank you very much. I will leave."). After this, the vehicle action-executing device 117 induces the automatic driving control device 114 to start the vehicle 101c in motion based on the action of loading agricultural products on the loading platform 212 by the farmer.

As is clear from the above description, in the present example 4, the image-capturing device 120 captures the loading platform 212 in order to determine whether the action has been taken in accordance with the character information displayed on the information display device 121 and audio outputted from the audio output device 122.

The vehicle 101c as described above can also coexist and cooperate with people, and can have a hardware structure and/or a software structure of low complication for the same reason as the vehicle 101. Further, according to the vehicle 101c, the person-identifying device 118 can easily identify the vehicle user for the same reason as the vehicle 101. In addition, according to the vehicle 101c, the vehicle can transmit more information to the vehicle user because the vehicle user looks at the information display device 121 for the same reason as the vehicle 101

Example 5 of the Embodiment

Next, a vehicle according to the example 5 of the embodiment of the present teaching will be described. FIG. 4 is incorporated herein for the reason that the structure of the vehicle 101d is the same as that of the vehicle 101.

The vehicle 101d is a party vehicle. A party vehicle is a vehicle in which a plurality of passengers enjoys a party while the party vehicle is traveling. In the present example 5, the vehicle 101d travels automatically, for example, so as to go south along Midosuji Street from Umeda to Shinsaibashi. The vehicle 101d may travel in the Expo site. A plurality of passengers of the vehicle 101d enjoys a party in the vehicle 101d. Therefore, the vehicle users are a plurality of passengers.

The vehicle 101d comprises an electronic signboard (not shown). The electronic signboard advertises goods of the sponsor to a person around the vehicle 101d. The advertising fee from the sponsor enables, for example, a plurality of passengers to enjoy the party free of charge or at a low cost.

The action-inducing control device 115 also induces the information display device 121 to display an image for inducing a plurality of passengers to sample foods or drinks which are goods by the sponsor. Further, the action-inducing control device 115 induces the audio output device 122 to output audio for inducing a plurality of passengers to sample foods or drinks which are goods by the sponsor. In other words, sampling foods or drinks is the action of the vehicle user. A plurality of passengers samples foods or drinks.

The image-capturing device 120 captures a plurality of passengers. The action recognition device 116 recognizes whether the passenger has sampled foods or drinks based on the image signal outputted from the vehicle user image-capturing device 120. If a passenger sampled foods or drinks, the vehicle action-executing device 117 asks what the passengers thought of sampling foods or drinks based on the sampling of foods or drinks by the passengers recognized by the action recognition device 116. The questions are asked by the information display device 121 and the audio output device 122.

The vehicle 101d as described above can have a hardware structure and/or a software structure of low complication for the same reason as the vehicle 101. Further, according to the vehicle 101d, the person-identifying device 118 can easily identify a vehicle user for the same reason as the vehicle 101. In addition, according to the vehicle 101 d, the vehicle can transmit more information to the vehicle user because the vehicle user looks at the information display device 121 for the same reason as the vehicle 101.

Other Embodiments

Embodiments and modifications described or illustrated herein are for facilitating to understand the present disclosure and are not intended to limit the spirit of the present disclosure. The embodiments and modifications described above can be modified and improved without departing from the object thereof.

Such objects include equivalent elements, modifications, deletions, combinations (for example, combinations of features across embodiments and variations), improvements, and modifications that can be recognized by those skilled in the art based on the embodiments disclosed herein. The limitations in the claims should be broadly interpreted based on the terms used in the claims and should not be limited to the embodiments and variations described herein or during prosecution of the present application. Such embodiments and variations should be construed as non-exclusive. For example, in this specification, the terms "preferably" and "good" are non-exclusive and mean "be preferred but not limited to" and "be good but not limited to".

The vehicle user may be any person who is loaded by the vehicles 101, 101a, 101b, 101c, and 101d or any person who use baggage loaded in the vehicles 101, 101 a, 101 b, 101 c, and 101 d. Accordingly, examples such as the passenger of the vehicle, the seller of baggage loaded in the vehicle, the purchaser of baggage loaded in the vehicle, the sender of baggage loaded in the vehicle or the recipient of baggage loaded in the vehicle are provided.

In the vehicle 101, 101d, the image-capturing device 120, the information display device 121, and the audio output device 122 are arranged at the front part of the vehicle 101, 101d. However, the arrangement of the image-capturing device 120, the information display device 121, and the audio output device 122 is not limited thereto. In the vehicle 101, 101d, a vehicle user gets in the vehicle 101, 101d from a region in the right direction of the vehicle 101, 101d. Therefore, when the image-capturing device 120 is used to capture that the vehicle user gets in, the image-capturing device 120, the information display device 121, and the audio output device 122 are preferably arranged near the left side of the vehicle 101, 101d. In this case, the optical axis of the image-capturing device 120 extends in the right direction. In this way, it is desirable that the image-capturing device 120, the information display device 121, and the audio output device 122 are arranged such that the optical axis of the image-capturing device 12 traverses an entrance of the vehicle 101, 101d and is directed from the inside of the vehicle 101, 101d to the outside of the vehicle 101, 101d with respect to the entrance of the vehicle 101, 101d.

In the vehicle 101a, the sender requests to receive baggage by using a smartphone. However, the sender may request to receive baggage by using a portable terminal other than a smartphone, or may request to receive baggage by using a terminal other than the portable terminal (for example, a personal computer).

In the vehicle 101, the vehicle user inputs registration information by using the vehicle use registration terminal 200. However, the vehicle user may input the registration information by using such as a portable terminal (a smartphone) or a personal computer.

In the vehicle 101, the audio output device 122 may output audio so that the vehicle user feels that audio is outputted from a place where the image-capturing device 120 and the information display device 121 are arranged. Accordingly, the audio output device 122 may not be integrated with the image-capturing device 120 and the information display device 121. In addition, the audio output device 122 may not be adjacent to the information display device 121. For example, the audio output device 122 may output audio such that the vehicle user feels that the audio is outputted from a place where the image-capturing device 120 and the information display device 121 are arranged from the reflection of the audio.

The vehicles 101, 101a, 101b, 101c, and 101d may further comprise a microphone. The action recognition device 116 may recognize the action of the vehicle user based on the image of the vehicle user captured by the image-capturing device 120 and the audio of the vehicle user collected by the microphone.

In the vehicles 101, 101a, 101b, and 101c, when the vehicle user cannot be identified, the person-identifying device 118 may enclose the face of the vehicle user that cannot be identified in the image displayed by the image-capturing device 120 in a red frame.

While the display unit with the touch panel 202 is displaying the image shown in FIG. 10, the camera 204 may capture the face of the vehicle user again if necessary.

The information display device 121 may display a character. Accordingly, the vehicle user or the person around the vehicle 101 gets to pay attention to the information display device 121. This results in less overlap between faces of a plurality of vehicle users or a plurality of people around the vehicle 101 when the image-capturing device 120 captures a plurality of vehicle users or a plurality of people around the vehicle 101. As a result, the image-capturing device 120 can easily capture the face of the vehicle user or the person around the vehicle 101. In addition, the vehicle can transmit more information to the vehicle user or the person around the vehicle 101 because the vehicle user or the person around the vehicle 101 looks at the information display device 121.

The vehicle users are preferably people who live in a small community rather than in an unspecified large number of people. This reduces the load on the person-identifying device 118.

Note that in the vehicle 101a, baggage may contain the registration information of a sender and/or a recipient, or may contain symbols or numbers associated with the registration information of the sender and/or the recipient.

In addition, the vehicle 101a may, for example, patrol an area where there are few medical institutions. In this case, the vehicle 101a may go to a house where an elderly person lives, and determine such as the health condition. The vehicle 101a may also contact a medical institution that the elderly person uses if necessary. The vehicle 101a may also go shopping for daily necessities after receiving a request from the elderly person.

Furthermore, the vehicle 101a may also deliver baggage among people within a community. In this case, the person-identifying device 118 performs face authentication of a sender and a recipient.

In addition, the action-inducing control device 115 may induce the information display device 121 to display an image for inducing a person around the vehicle 101, 101a, 101b, 101c, 101d captured by the image-capturing device 120 to take a vehicle-user action, and/or induce the audio output device 122 to output audio for inducing a person around the vehicle 101, 101a, 101b, 101c, 101d captured by the image-capturing device 120 to take a vehicle-user action. In this case, the vehicle-user action is, for example, a motion in which a person around the vehicle 101, 101a, 101b, 101c, 101d gives a way for the vehicles 101, 101a, 101b, 101c, 101d so as for the vehicles 101, 101a, 101b, 101c, 101d to travel.

At least one of the automatic driving control device 114, the action-inducing control device 115, the action recognition device 116, the vehicle action-executing device 117, and the person-identifying device 118 may be provided outside the vehicle body 102. In this case, at least one of the automatic driving control device 114, the action-inducing control device 115, the action recognition device 116, the vehicle action-executing device 117, and the person-identifying device 118 communicates with the vehicle 101, 101a, 101b, 101c, 101d via such as the Internet line.

The action-inducing control device 115 induces the information display device 121 to display an image for inducing the vehicle user or the person around the vehicle 101 captured by the image-capturing device 120 to take a vehicle-user action, and induces the audio output device 122 to output audio for inducing the vehicle user or the person around the vehicle 101 captured by the image-capturing device 120 to take a vehicle-user action. However, the action-inducing control device 115 may induce the information display device 121 to display an image for inducing the vehicle user or the person around the vehicle 101 captured by the image-capturing device 120 to take a vehicle-user action, or induce the audio output device 122 to output audio for inducing the vehicle user or the person around the vehicle 101 captured by the image-capturing device 120 to take a vehicle-user action.

REFERENCE SIGNS LIST 50 autonomous vehicle
52 automatic driving device
54 vehicle body
541 deck
56 action inducing device
561 image capturing device
562 information presentation device
563 action recognition device
564 person identifying device
101, 101a, 101b, 101c, 101d vehicle
102 vehicle body
104 wheel
104BL left rear wheel
104BR right rear wheel
104FL left front wheel
104FR: right front wheel
106 steering device
107 vehicle motion device
108 driving force generator
110 braking force generator
112 seat
112BL left back seat
112BR right back seat
112FL left front seat
112FR right front seat
112ML left middle seat
112MR right middle seat
114 automatic driving control device
115 action-inducing control device
116 action recognition device
117 vehicle action-executing device
118 vehicle user identification device
120 vehicle user image-capturing device
121 information display device
122 audio output device
124 vehicle user identification device
200 vehicle use registration terminal
202 display unit with a touch panel
204 camera
212 loading platform

The invention claimed is:

1. An autonomous vehicle that moves automatically without any driver's manipulation, the autonomous vehicle comprising:
a vehicle body including a deck; and
an action-inducing device for inducing an action of a person who is a user of the autonomous vehicle, the action-inducing device including
an image-capturing device for capturing the person, and
an information presentation device for presenting action-inducing information, to thereby induce the person to take the action,
wherein the person captured by the image-capturing device is the user of the autonomous vehicle and is on the deck,
wherein the action is making a gesture,
wherein the action-inducing device
induces the person captured by the image-capturing device to take action by having the information presentation device present the action-inducing information, and
captures the person to whom the action-inducing information is presented by the information presentation device by the image-capturing device to determine whether or not the person has taken the induced action.

2. The autonomous vehicle according to claim 1, wherein the image-capturing device captures the action of the person, and
the action-inducing device further includes an action recognition device for recognizing the action of the person.

3. The autonomous vehicle according to claim 2, further comprising an automatic driving device for moving or stopping the autonomous vehicle based on the action recognized by the action recognition device.

4. The autonomous vehicle of claim 3, wherein the automatic driving device starts the autonomous vehicle in motion based on the action recognized by the action recognition device.

5. The autonomous vehicle according to claim 1, wherein the action-inducing device further includes a person-identifying device for identifying the person captured by the image-capturing device; and
the information presentation device presents the action-inducing information to induce the person identified by the person-identifying device to take the action.

6. The autonomous vehicle according to claim 1, wherein the information presentation device includes an information display device for displaying an action-inducing image, the action-inducing information including the action-inducing image, and
the image-capturing device and the information display device are arranged such that the person captured by the image-capturing device can see the image-capturing device and the information display device simultaneously.

7. The autonomous vehicle according to claim 6, wherein the information presentation device further includes an audio output device for outputting an action-inducing audio, the action-inducing information further including the action-inducing audio, and the audio output device is so arranged that the action-inducing audio is perceived by the person captured by the image-capturing device to be outputted from a place where the image-capturing device and the information display device are arranged.

8. The autonomous vehicle according to claim 1, wherein the autonomous vehicle has a maximum riding capacity that is smaller than a first threshold, has a maximum loading capacity that is smaller than a second threshold, or has a size that is smaller than a third threshold.

9. The autonomous vehicle according to claim 8, wherein the first threshold is 10, the second threshold is 1 ton, and the third threshold is 5 meters by 1.5 meters.

10. The autonomous vehicle according to claim 1, wherein the autonomous vehicle has a maximum speed that is lower than a predetermined limit.

11. The autonomous vehicle according to claim 10, wherein the predetermined limit is 60 km/h.

* * * * *